(12) United States Patent
Lin et al.

(10) Patent No.: US 10,450,478 B1
(45) Date of Patent: Oct. 22, 2019

(54) EPOXY RESIN, AQUEOUS DISPERSION AND WATER-BORNE EPOXY COATING COMPOSITION COMPRISING THE SAME

(71) Applicant: CHANG CHUN PLASTICS CO., LTD., Taipei (TW)

(72) Inventors: Ying-Jui Lin, Taipei (TW); Liang-Hsing Liu, Taipei (TW); Yung-Sheng Lin, Taipei (TW); I-Chiang Lai, Taipei (TW); Yi-Sern Wong, Taipei (TW); Kuen-Yuan Hwang, Taipei (TW)

(73) Assignee: CHANG CHUN PLASTICS CO., LTD., Taipei (TW)

( * ) Notice: Subject to any disclaimer, the term of this patent is extended or adjusted under 35 U.S.C. 154(b) by 0 days.

(21) Appl. No.: 16/371,719

(22) Filed: Apr. 1, 2019

Related U.S. Application Data

(60) Provisional application No. 62/749,503, filed on Oct. 23, 2018.

(51) Int. Cl.
| | | |
|---|---|---|
| *C09D 163/00* | (2006.01) | |
| *C08G 59/38* | (2006.01) | |
| *C08G 59/50* | (2006.01) | |
| *C09D 5/08* | (2006.01) | |

(52) U.S. Cl.
CPC .......... *C09D 163/00* (2013.01); *C08G 59/38* (2013.01); *C08G 59/5006* (2013.01); *C09D 5/08* (2013.01); *C08G 2150/90* (2013.01)

(58) Field of Classification Search
CPC ........ C08G 59/34; C08G 59/36; C08G 59/38; C08G 59/245; C08G 59/50; C08G 59/502
See application file for complete search history.

(56) References Cited

U.S. PATENT DOCUMENTS

| | | | | |
|---|---|---|---|---|
| 9,938,428 B2* | 4/2018 | Fischer | ............ | C08G 59/1438 |
| 2017/0321080 A1* | 11/2017 | Chen | ................. | C08G 65/3318 |

OTHER PUBLICATIONS

Liu et al., Composites: Part A 38 (2007) 87-93.*
STN Search.*

* cited by examiner

*Primary Examiner* — Vu A Nguyen
(74) *Attorney, Agent, or Firm* — Nixon Peabody LLP; Thomas P. Pavelko

(57) ABSTRACT

The present invention provides an epoxy resin comprising: a polymer having a structure of a reaction product of a monomer of epoxy having at least two epoxide groups per molecule, a polyether monoamine, and an epoxidized oil. The present invention also provides an aqueous dispersion and a water-borne epoxy coating composition which comprise the epoxy resin. The present inventions are low in volatile organic compounds and have enhanced properties such as high hardness, high adhesion strength, high impact resistance and high corrosion resistance.

14 Claims, 17 Drawing Sheets

EPOXY RESIN, AQUEOUS DISPERSION AND WATER-BORNE EPOXY COATING COMPOSITION COMPRISING THE SAME

CROSS-REFERENCE TO RELATED APPLICATIONS

This application claims benefit under 35 U.S.C. § 119(e) of the U.S. Provisional Application No. 62/749,503 filed Oct. 23, 2018, the content of which is incorporated herein by reference in its entirety.

FIELD OF THE INVENTION

This invention relates to an epoxy resin, a dispersion and a water-borne epoxy coating composition comprising the same. More particularly, the invention relates to an epoxy resin having water-borne property and low in VOC, a dispersion and a coating composition comprising the same.

BACKGROUND

Epoxy resins based on diglycidyl ether of bisphenol A were commercialized more than 50 years ago and their success is driven by the excellent adhesion, and high chemical and corrosion resistance that these coating provide when applied directly onto metal without a primer or other coatings. These high-performance epoxy primers were historically based on solvent based epoxy resins. Although these resins provide excellent performance, they have the disadvantage of relatively high volatile organic compounds (VOC) content.

Water-borne two component epoxy resin formulations can be an attractive alternative for the solvent-based systems despite their higher cost and, in some respects, slightly reduced performance. The application of aqueous epoxy resin dispersions has been known for about 30 years. For example, recently issued U.S. Pat. No. 9,938,428 B2 (incorporated herein by reference) describes aqueous epoxy resin dispersions which are low in VOC.

BRIEF SUMMARY OF THE INVENTION

The continued and sustained research and development in this area shows that there remains a need for new compounds, compositions, formulations and methods that are economical, reduce the amount of VOCs evolved during drying and crosslinking, while also having the mechanical and physical advantages of solvent based systems. In particular, there is a need for epoxy resin based compositions having low VOCs, enhanced impact resistance, and enhanced hardness of paint films. The present disclosure addresses these needs.

In one aspect, the invention comprises an epoxy resin comprising a polymer having a structure of a reaction product of (A) a monomer, oligomer, or precursor of epoxy wherein the monomer, oligomer, or precursor has at least two epoxide groups per molecule, (B) a polyether monoamine, and (C) an epoxidized oil. Optionally, (A) the monomer of epoxy having at least two epoxide groups per molecule is obtained by reacting (A1) another monomer of epoxy having at least two epoxide groups per molecule with (D) an aromatic polyol. In some embodiments, (A1) the another monomer of epoxy having at least two epoxy groups per molecule is at least one selected from diglycidyl ether of bisphenol-A (DGEBA), diglycidyl ether of bisphenol-F and diglycidyl ether of bisphenol-S.

In some embodiments, the epoxy resin has a structure of general formula (I):

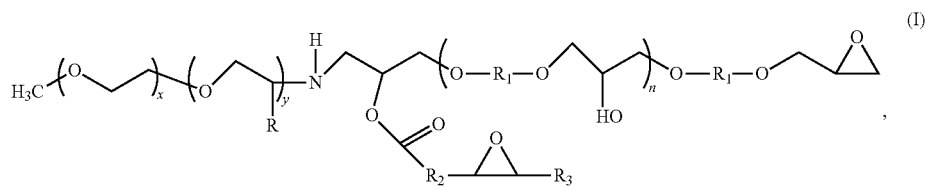

wherein R is hydrogen or $CH_3$; $R_1$ is an organic linking group; $R_2$ and $R_3$ independently represent $C_1$-$C_{20}$ alkyl, $C_1$-$C_{20}$ alkenes, epoxides group or glycidyl ethers group thereof; n represents the number of repeating units and is an integer in the range of 1 to 20; x represents the number of repeating units and is an integer of from 1 to 40; and y represents the number of repeating units and is a number from about 1 to 40. Optionally, the organic linking group is at least one selected from the group consisting of:

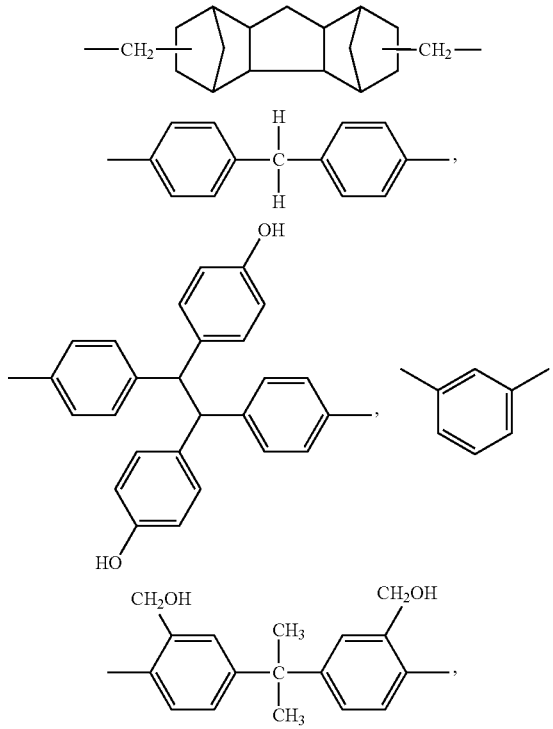

-continued
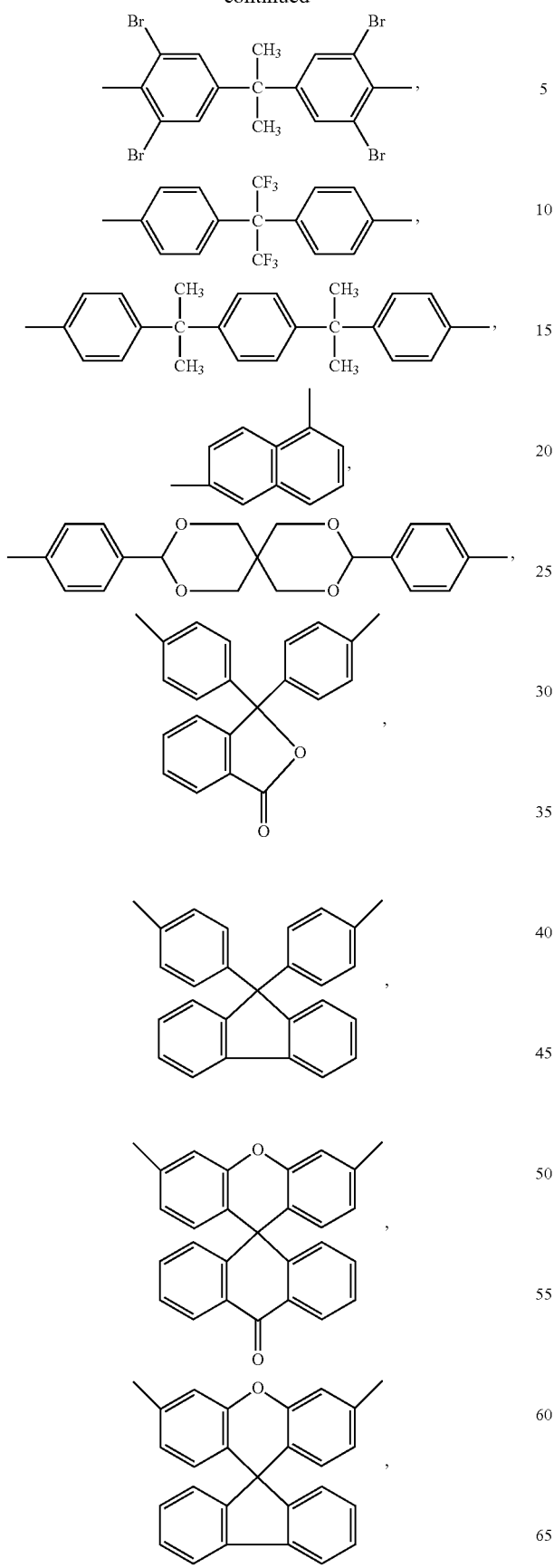
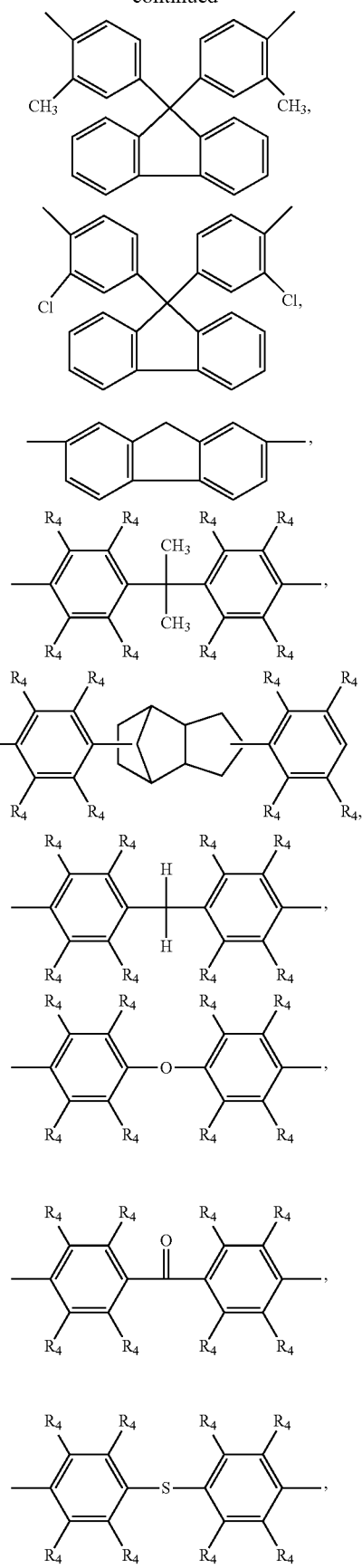

-continued
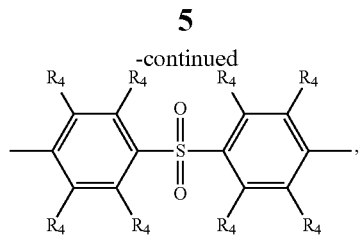
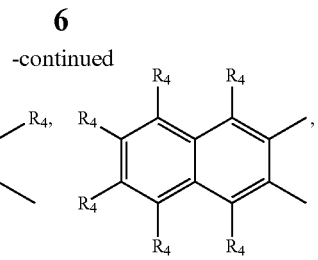
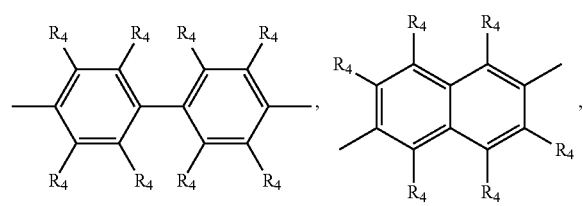
wherein each $R_4$ independently represents one selected from the group consisting of H, F, Cl, Br, $C_1$-$C_{10}$ alkyl, $C_1$-$C_{10}$ alkoxy, a cyclic alkyl group having 3-7 carbon atoms, phenyl, and phenoxy group. Optionally, the epoxy resin has a structure of at least one selected from the group consisting of general formulas (II), (III), and (IV):
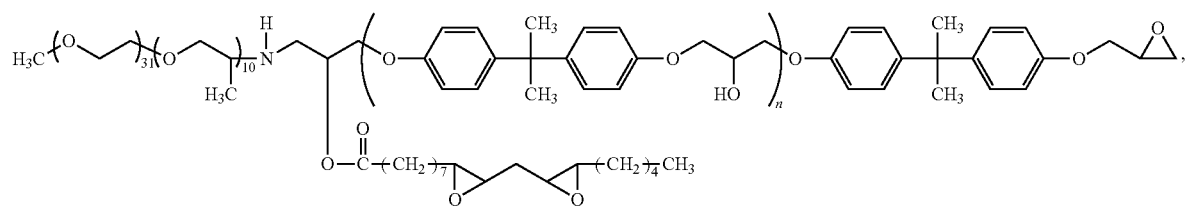
(II)
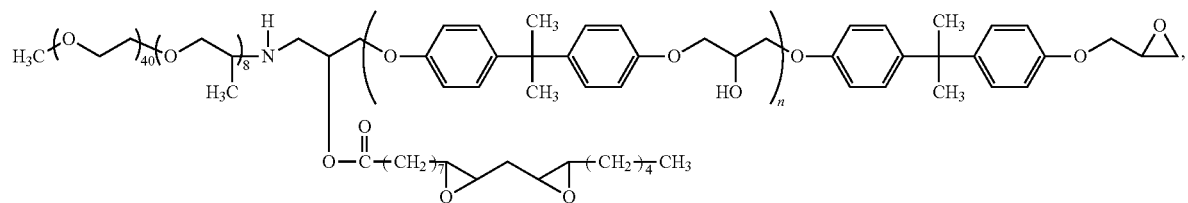
(III)
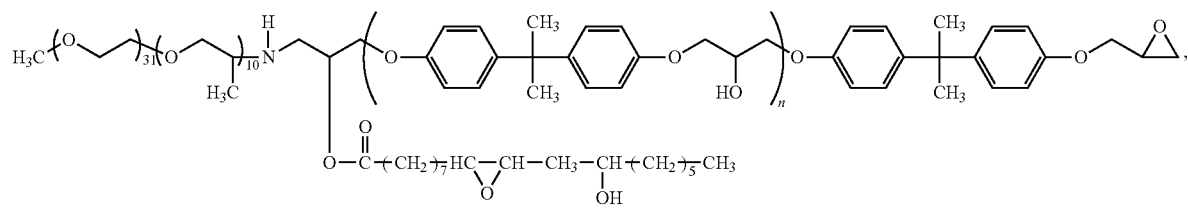
(IV)

wherein each n independently represents the number of repeating units and is an integer in the range of 1 to 4.

In some embodiments, (D) the aromatic polyol is bisphenol-A. Optionally, (B) the polyether monoamine has a structure of general formula (V):

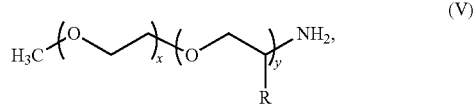

(V)

wherein R is hydrogen or $CH_3$; x is an integer of 1 to 40; and y is an integer of from 1 to 40. In some embodiments, R is $CH_3$; x is 31; and y is 10. Optionally, (C) the epoxidized oil is at least one selected from the group consisting of an epoxidized soybean oil (ESBO), an epoxidized castor oil (ECO), an epoxidized linseed oil, an epoxidized palm oil, an epoxidized stearic oil, an epoxidized oleic oil, an epoxidized tall oil, and an epoxidized linoleic oil. In some embodiments, the epoxidized soybean oil is one selected from the group consisting of formulas (VI), (VII) and (VIII):

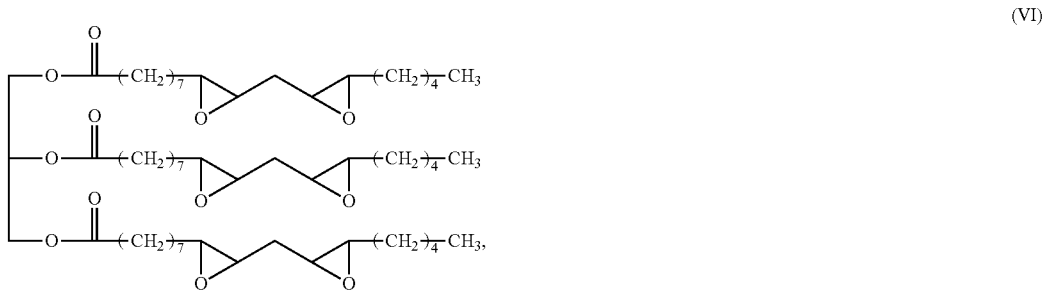

(VI)

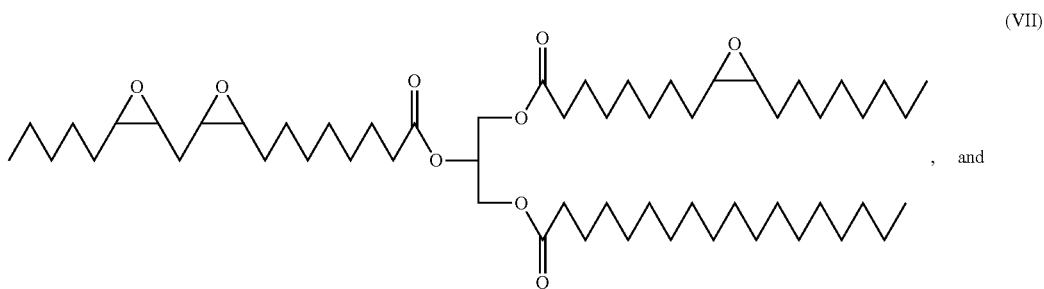

(VII)

, and

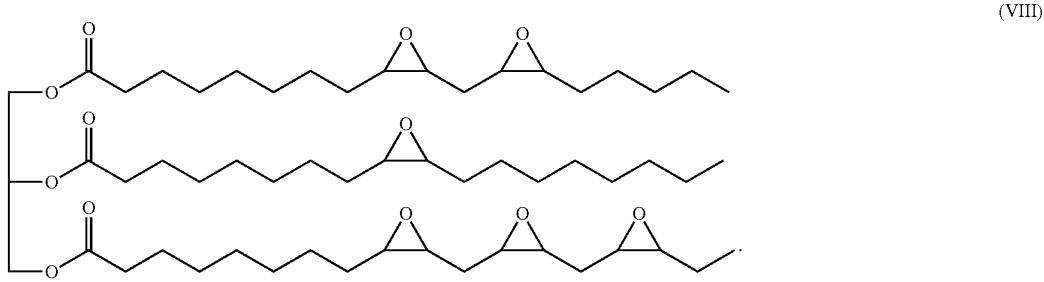

(VIII)

In some embodiments, the epoxidized castor oil is of formula (IX):

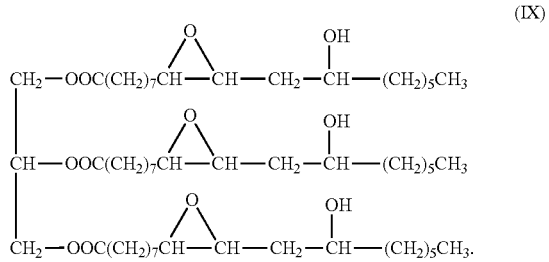

(IX)

Another aspect provided herein relates to an aqueous dispersion of the epoxy resin. In some embodiments of the aqueous dispersion, the epoxy resin has a structure of general formula (I). Optionally, the epoxy resin has a structure of at least one selected from the group consisting of general formulas (II), (III), and (IV).

In another aspect, there is provided a water-borne epoxy coating composition comprising: the epoxy resin as described above, and further comprising at least one additive selected from the group consist of: a pigment, a dye, an anti-foaming agent, a rheology modifier, a filler, an extender, a corrosion inhibitor, water and combinations of these. Optionally, the composition further comprises a curing agent. In some embodiments, the water-borne epoxy coating composition has a hardness by pencil test (ASTM D 3363-00) of equal to or greater than B degree. Optionally, the water-borne epoxy coating composition has an adhesion degree of 5B by adhesion test (ASTM D 3359-09).

In addition to the polymers described herein being formulated into epoxy resins and aqueous dispersions thereof, these epoxy resins can form coating compositions having high corrosion resistance, high adhesion to their coating surface and high impact resistance. Coatings made using these epoxy resins impart improved surface characteristics such as high hardness, good adhesion, good impact resistance, good corrosion resistance and low VOCs. Intermediate compounds also form part of the inventions disclosed herein.

Other features and advantages of the invention will be apparent from the Detailed Description, and from the claims. Thus, other aspects of the invention are described in the following disclosure and are within the ambit of the invention.

DETAILED DESCRIPTION

The methods, compositions and structures provided herein are based in part on the preparation of polymers. The polymers include the reaction product of a monomer (or oligomer or precursor) having multiple epoxy groups with a polyether monoamine and an epoxidized oil. The polymers can be formulated into epoxy resins, aqueous dispersion (also called water-borne epoxy resin), and coating compositions, where the coatings can have desirable properties including low VOCs, high hardness, high adhesion strength, high impact resistance, and high corrosion resistance.

The epoxy resin of the present invention is a kind of resin compositions suitable for being formulated in water, for example as a suspension, emulsion or microemulsion. In some embodiments, the epoxy resin or the water-borne epoxy coating composition comprising the same can be a stable emulsion, such that, for example, wherein if the epoxy resin is placed in a 1 cm diameter tube to a vertical height of 10 cm from a bottom of the tube, and left in the vertical position, the concentration at the bottom first cm is not more than 1 wt. % (e.g., not more than 5 wt. %, not more than 10 wt. %, not more than 20 wt. %, not more than 50 wt. %) of the concentration of the top first cm for at least one hour (e.g., at least six hours, at least one day, at least one week, at least one month). In some embodiments, the water-borne epoxy resin and the water-borne epoxy coating composition comprising the same have between about 5 and about 95 wt. % water (e.g., 10-80%, 10-70%, 10-60%, 10-50%, 10-40%). In some embodiments, the water-borne epoxy resin has a particle size distribution of $D_{50}$ between about 0.01 µm and 0.8 µm and a $D_{90}$ between about 0.2 µm and 10 µm. In some embodiments, the particle size distribution of $D_{50}$ is between about 0.1 µm and 0.5 µm, and $D_{90}$ between about 0.5 µm and 2 µm. As used herein the "$D_{50}$" denotes that 50% of the particles are smaller than the $D_{50}$ value, and "$D_{90}$" denotes that 90% of the particles are smaller than the $D_{90}$ value.

Figure 1:
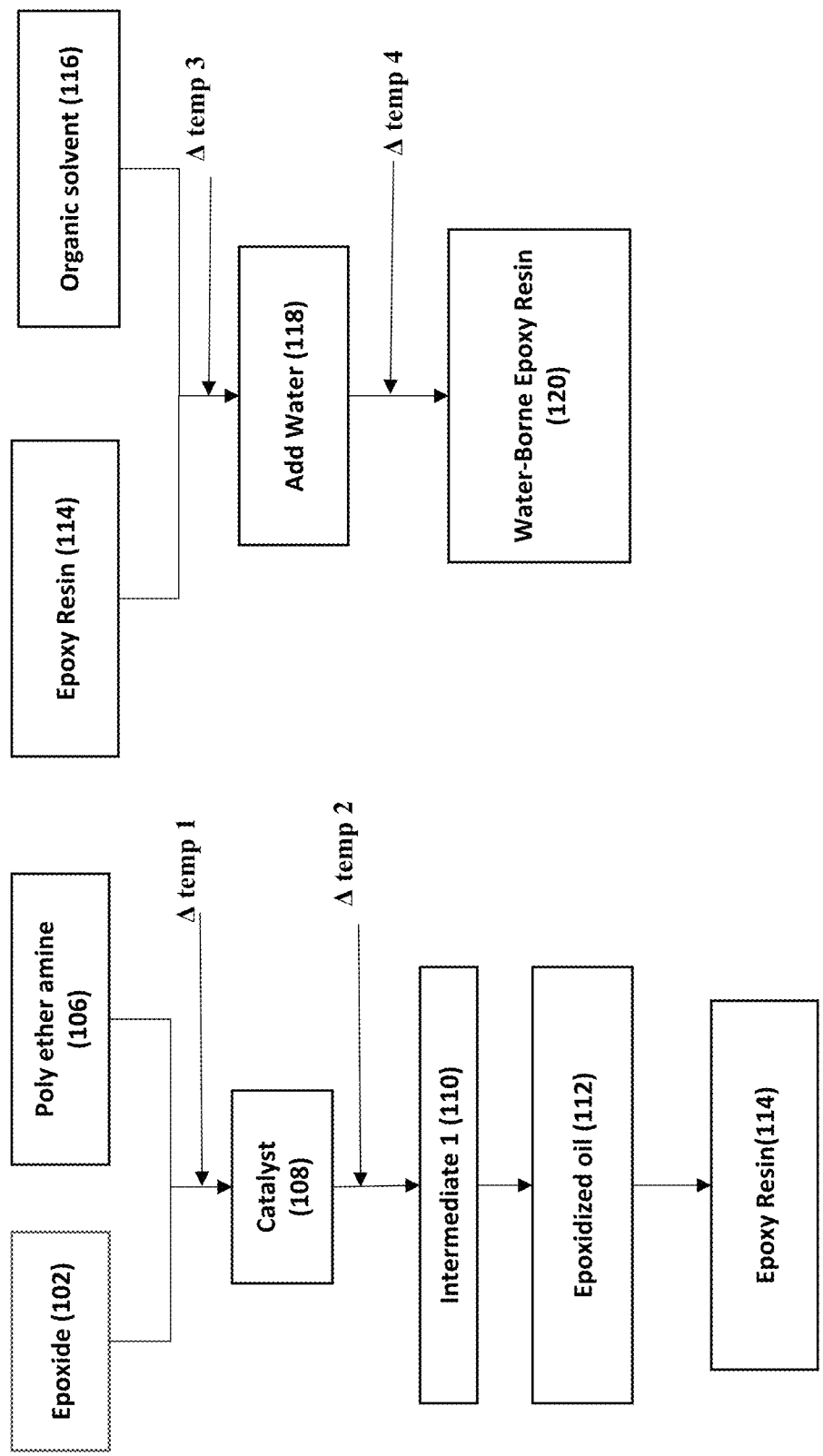
FIG. 1 is a flow diagram showing a generalized reaction to make the epoxy resins according to some embodiments of the present invention.

FIG. 1 shows a flow diagram for a generalized reaction to make epoxy resins according to some embodiments of the invention. In a first step, (A) a first epoxide monomer having at least two epoxide groups per molecule (102), and (B) a polyether monoamine (106) are mixed at a first temperature (temp 1), or mixed at room temperature (e.g. between about 20 and 40° C.) and then the temperature is adjusted to temp 1. A catalyst (108) is then combined with the mixture of (A) and (B) and the temperature is controlled to a second temperature (temp 2). The catalyst can be added immediately after mixing (102) and (106), or after a time, for example after more than 10 min (e.g., more than 20 min, more than about 40 min). In some embodiments, temp 2 is higher than temp 1. For example, temp 1 can be less than about 100° C. (e.g., less than about 90° C.) while temp 2 can be higher than about 100° C. (e.g., higher than 120° C., higher than 140° C.). The reaction is monitored and allowed to proceed to a desired epoxide equivalent amount providing an intermediate 1 (110). In some embodiments, the epoxide equivalent amount is at least about 400 g/eq. (e.g., at least about 500 g/eq., at least about 520 g/eq.). To the mixture containing intermediate 1 (110), (C) an epoxidized oil (112) is added and a reaction is allowed to proceed for a time wherein the amount of epoxide equivalents is increased. For example, the epoxide equivalents can be increased by more than 10 g/eq. (e.g., more than about 20 g/eq.). The reaction produces a mixture which includes the coupling product of the intermediate 1 (110), i.e., the epoxy resin (114), and an epoxidized fatty acid as well as any residue from the epoxidized oil starting material (e.g., a di-glyceride or a mono-glyceride). In some embodiments, the epoxy resin (114) can be stored for a time (e.g., overnight, or for more than a day) prior to being dispersed in water. In other embodiments, the aqueous dispersion of the epoxy resin (114) is immediately prepared. In either of these embodiments (immediate or delayed dispersion), the intermediate is controlled to a third temperature temp 3 for the dispersion step. The third temperature can be lower than temp 2. In some embodiments, temp 3 is equal to or less than about 100° C. In some embodiments, e.g., before or after reaching temp 3, an organic solvent (116) is added to the epoxy resin (114) and the mixture is mixed. Water is then added (118) and the combination is mixed while it is allowed to reach a fourth temperature. In some embodiments, the fourth temperature is the ambient room temperature (e.g., between about 20 and 40° C.). This provides the aqueous dispersion (120), i.e., the water-borne epoxy resin.

In some embodiments, the epoxide (102) is the reaction product of (A1) a second epoxide monomer having at least two epoxide groups per molecule and (D) a polyol. In some embodiments, this reaction product is prepared and added in the first step with (B) polyether monoamine (106). In some embodiments, (A1) the second epoxide, (D) a polyol and (B) the polyether monoamine (106) are combined in the first step.

In some embodiments, (A) the first and (A1) the second epoxide monomers can have at least two epoxide groups, e.g., having two, three, four or more epoxide groups linked by an organic linker. In some embodiments, (D) the polyol is an aromatic polyol. Also in some embodiments, (D) the polyol can have at least two hydroxyl groups (e.g., alcohol groups). A linker can be any group that forms a bond to the two or more epoxide groups, or two or more hydroxyl groups and includes, monomers, oligomers, and polymer precursors. In some embodiments, (A) the first epoxide monomer, (A1) the second epoxide monomer and (D) the polyol have the formula L-$(R_5)_m$ wherein: L is any linking group, and m is an integer number of $R_5$ functional groups where $R_5$ can be a hydroxyl group, epoxy group or a glycidyl group. In some embodiments, (A) the first epoxide monomer, (A1) the second epoxide monomer and (D) the polyol have the structure X:

where $R_1$ is an organic linking group and $R_5$ is selected from a hydroxyl or a glycidyl group. In some embodiments, $R_1$ is selected from the group consisting of:

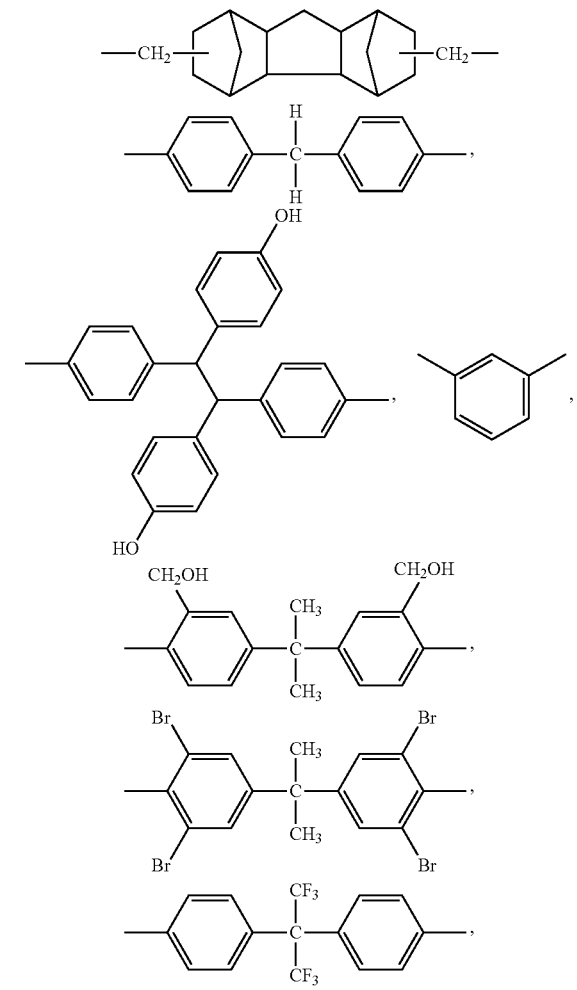

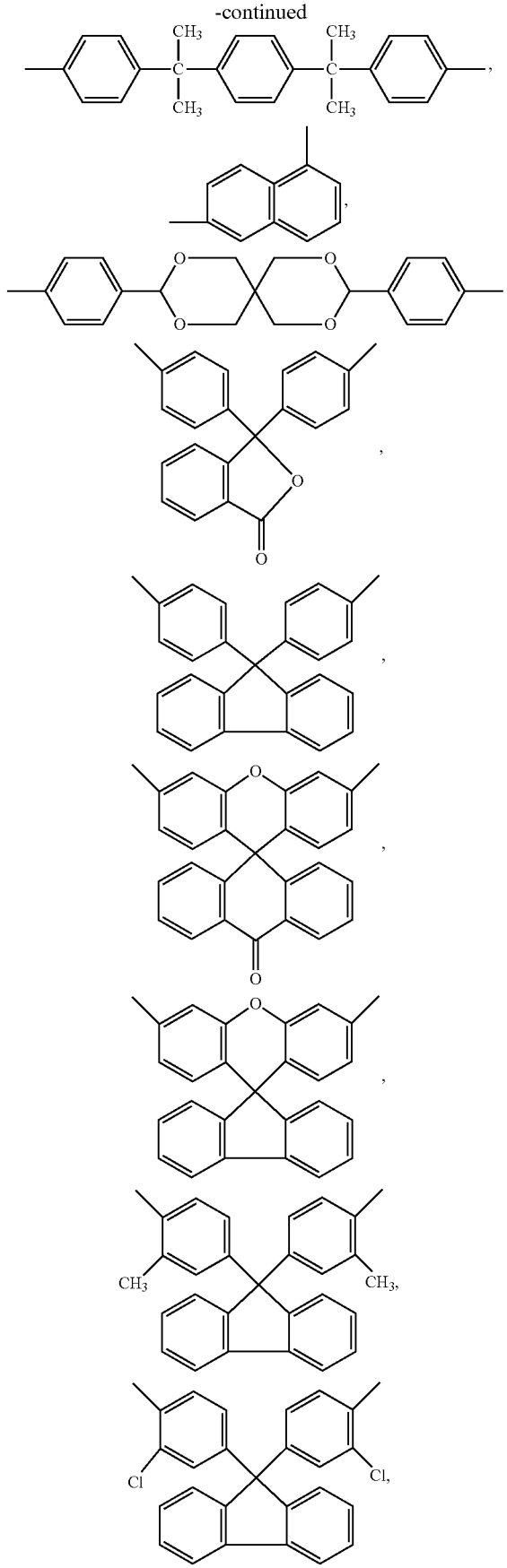
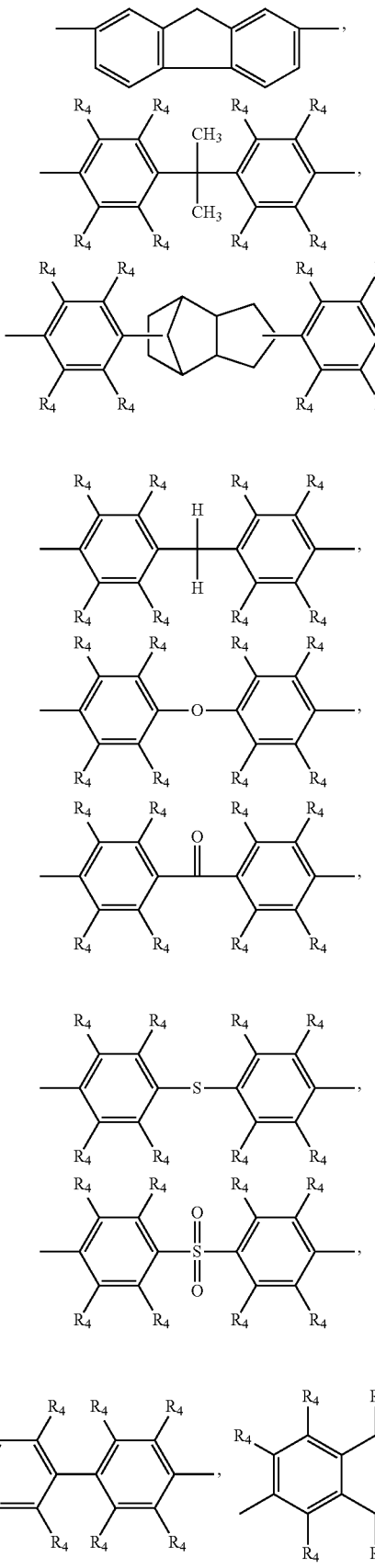

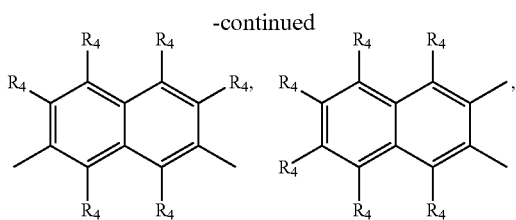

wherein each $R_4$ independently represents one selected from the group consisting of H, F, Cl, Br, $C_1$-$C_{10}$ alkyl, $C_1$-$C_{10}$ alkoxy, a cyclic alkyl group having 3-7 carbon atoms, phenyl, and phenoxy group. It is understood that the linker group L or organic linker group $R_1$ can be the same or different in an epoxy resin made in these described methods.

As used herein, (B) a "polyether monoamine" is a polymer or oligomer having a polyether chain and a monoamine functional group. In some embodiments, (B) the polyether monoamine is the reaction product of a mono-alcohol initiator with a polyethylene oxide or polypropylene oxide, followed by conversion of the resulting terminal hydroxyl groups to amines, although any method of preparing the monoamine is contemplated. In some embodiments, (B) the polyether monoamine is a JEFFAMINE® Monoamines M series, selected from; JEFFAMINE® M-600 polyetheramine, JEFFAMINE® M-1000 polyetheramine, JEFFAMINE® M-2005 polyetheramine, JEFFAMINE® M-2070 polyetheramine, JEFFAMINE® M-2095 polyetheramine, JEFFAMINE® M-3085 polyetheramine or mixtures of these, where "M" signifies a monoamine, the number represents the approximate molecular weight, and the monoamines have the general structure shown by structure V as previously described. In some embodiments, (B) the polyether monoamine is JEFFAMINE® M-2070 or JEFFAMINE® M-2095. Products marketed under brands different from the JEFFAMINE® brand can also be used.

As used herein, (C) an "epoxidized oil" are epoxidized fatty acid esters and mixtures thereof. For example, the fatty acid ester can be derived from, or have a structural unit from, one or more mono- or poly-unsaturated fatty acids (e.g., having one, two, three, four, five, six, or more, unsaturated groups), and one or more alcohol groups. For example, the fatty acid ester is the condensation reaction of the unsaturated fatty acid and the alcohol. (C) The epoxidized oil can be the epoxidized product of the fatty acid ester. In some embodiments, the epoxy groups replace at least about 10% of the unsaturated groups available in a plurality of poly unsaturated fats (e.g., at least about 20%, at least about 50%, at least about 75% or even about 100%), where the distribution of the epoxidation can be at least partially random between the individual fatty acids (intermolecular) and an individual fatty acid (intramolecular), or a specific subset of unsaturated groups in the fatty acid are preferentially epoxided. In some embodiments, the epoxidation to produce an epoxided fatty acid can occur before a condensation reaction producing the fatty acid. In some embodiments, the epoxidation to produce the epoxidized fatty acid can occur after the condensation reaction producing the fatty acid.

Without limitation, mono-unsaturated fatty acid structural units of (C) the epoxidized oil can be selected from one or more of crotonic acid, myristoleic acid, palmitoleic acid, sapienic acid, oleic acid, elaidic acid, vaccenic acid, gadoleic acid, eicosenoic acid, erucic acid, and nervonic acid. Without limitation, di-unsaturated fatty acids can be selected from one or more of linoleic acid, eicosadienoic acid, and docosadienoic acid. Without limitation, tri-unsaturated fatty acids can be selected from one or more of linolenic acid, pinolenic acid, eleostearic acid, mead acid, dihomo-γ-linolenic acid, and eicosatrienoic acid. Without limitation, tetra-unsaturated fatty acids can be selected from one or more of stearidonic acid, arachidonic acid, eicosatetraenoic acid, and adrenic acid. Without limitation, penta-unsaturated fatty acids can be selected from one or more of bosseopentaenoic acid, eicosapentaenoic acid, ozubondo acid, sardine acid, and tetracosanolpentaenoic acid. Without limitation, hexa-unsaturated fatty acids can be selected from one or more of docosahexaenoic acid and herring acid.

In some embodiments, the alcohol portion of (C) the epoxidized oil can be any useful alcohol. For example, and without limitation, the alcohol can be selected from mono alcohols having from one and twelve carbons (e.g., methanol, ethanol, propanol, butanol, pentanol, and hexanol). Without limitation, the alcohol portion of the epoxidized fatty acid can be selected from diols having from about one to twelve carbon atoms, such as 1,2-ethanediol, 1,2-propanediol, and 1,3-butanediol. Without limitation, the alcohol can be selected from a triol having from about one and about twelve carbon atoms such a glycerol.

In some embodiments, where (C) the epoxidized oil has the structure of a product of an alcohol having one or more hydroxyl groups, not all the hydroxyl groups are condensed with the fatty acid groups. For example, where glycerol is the alcohol, the fatty acid can be a mono-, di-, or tri-glycerol and combinations of these.

In some embodiments, (C) the epoxidized oil is epoxidized soybean oil (ESBO). In some embodiments, the soybean oil has a fatty acid composition including poly-unsaturates alpha-linolenic acid, and linoleic acid, and the monounsaturated oleic acid. In some embodiments, the epoxidized soybean oil has at least a portion of the oil with structure VI, VII or VIII, previously described.

In some embodiments, (C) the epoxidized oil is epoxidized castor oil (ECO). In some embodiments, the castor oil has a fatty acid composition including ricinoleic acid, oleic acid, linoleic acid, α-linolenic acid, stearic acid, palmitic acid, and dihydroxystearic acid. In some embodiments, the epoxidized castor oil includes at least a portion of oil with structure IX, previously described.

In some embodiments, (C) the epoxidized oil is epoxidized linseed oil. In some embodiments, the epoxidized linseed oil has a fatty acid composition including triply unsaturated α-linolenic acid, saturated acids palmitic acid and stearic acid, monounsaturated oleic acid, and doubly unsaturated linoleic acid.

In some embodiments, (C) the epoxidized oil is an epoxidized palm oil. In some embodiments, the epoxidized palm oil has a fatty acid composition including unsaturated fats myristic acid, palmitic acid and stearic acid, the monounsaturated fat oleic acid, and the polyunsaturated fat linoleic acid.

In some embodiments, (C) the epoxidized oil is an epoxidized stearic oil. In some embodiments, the epoxidized stearic oil has a fatty acid composition including stearic acid.

In some embodiments, (C) the epoxidized oil is an epoxidized oleic oil. In some embodiments, the epoxidized oleic oil has a fatty acid composition including oleic oil.

In some embodiments, (C) the epoxidized oil is an epoxidized tall oil. In some embodiments, the epoxidized tall oil has a fatty acid composition including oleic acid, linoleic acid, linolenic acid, palmitic acid, and stearic acid.

In some embodiments, any of the intermediates (e.g., intermediates 1, 110), the epoxy resin (114) product, or the aqueous dispersion of the epoxy resin (120) product will also include any of the reagents, either un-reacted or reformed (e.g., by a reverse reaction such as a condensation or hydrolysis), used in the preparation of each intermediate or product, or any side products formed during the reaction. For example, in some embodiments, one or more of the reactions does not go to completion leaving from between 0.1 and 50% of any of the starting materials or reagents (e.g., less than about 30%, less than about 10%). In some embodiments, the reaction is a "one pot" reaction providing the epoxy resin in a useful form.

As used herein, "one pot" means there is no isolation involved and does not refer to how many vessels necessarily are used. In some embodiments, the one pot reaction is all done in one vessel while in other embodiments, the one pot reaction can be transferred from a first to a second, third or more vessels. The vessel can be any structure to contain the reacting and reaction products including standard lab ware such as round bottom flasks, Erlenmeyer flasks, beakers, as well as larger vessels such as pails (e.g., 10-50 L) and vessels made of plastics (polypropylene, polyurethane, stainless steel) for batch reaction (e.g., larger than 1 L, larger than 5 L, larger than 10 L, larger than 100 L or larger than 1000 L), as well as closed circulating systems such as continuous flow systems.

As used herein, "mix, mixed, mixing" means the components combine or put together to form one substance, mixture, or mass. Mixing can be by any effective means, for example using magnetic stirrer mixing, propeller mixing, impellor-stator mixing, jet mixing, shaking, sonication, and any combination of these. In some embodiments, the mixing provides a homogenized mixture.

In some embodiments, one or more of the reaction steps are conducted under an inert atmosphere. By inert it is meant that an oxygen concentration lower than ambient is used (e.g., less than about 18% oxygen). For example, inert gases can be used including any one or more of argon, helium or nitrogen at between 80 and about 100%. In some embodiments, nitrogen is used. Standard methods such as sparging, and freeze-pump-thaw methods can be used for degassing solvents and maintaining low oxygen in the reaction solutions and starting materials. The inert atmosphere can also be maintained by other known methods such as blanketing the reaction vessels with the inert gas using, for in house inert gas optionally coupled to manifolds (e.g., Schlenk line manifolds), glove boxes or glove bags.

In some embodiments, the water can include deionized and/or distilled water. The organic solvent can be any solvent known in the art. In some embodiments, the organic solvent is selected from propylene glycol monomethyl ether (PGME), methanol, ethanol, glycol ethers (e.g., diethyl, t-butyl ethers, cyclic ethers), diols, ketones (e.g., acetone) and mixtures of these. In some embodiments, the waterborne epoxy resin have low amounts of VOCs having virtually no (e.g., less than 1000 ppm, less than 100 ppm, less than 10 ppm, less than 1 ppm) volatile organic solvents such as aliphatic hydrocarbons, ethyl acetate, glycol ethers, and acetone. As used herein, an organic solvent is inclusive of a mixture containing more than one solvent. In some embodiments, the solvent is PGME.

As used herein, "epoxide equivalent amount" is the weight in grams of an epoxy resin containing one mole equivalent of epoxide. The epoxide equivalent amount can be measured or monitored by any method known in the art, such as pyrolysis gas chromatography, gel permeation chromatograph, spectral analysis such as infrared, near-infrared and nuclear magnetic resonance spectroscopy, and titration methods.

As used herein, a water-borne epoxy coating composition includes the water-borne epoxy resin as described herein and at least another additive. Additives can include one or more of a pigment, a dye, an anti-foaming agent, a rheology modifier, a filler, an extender, a corrosion inhibitor, and water.

As used herein, the terms "pigment" and "dyes" refers to any material that changes color of reflected or transmitted light as the result of wavelength selective adoption. Dyes are soluble compounds, whereas pigments are generally solid particles. Pigments and dyes can include both organic and inorganic ones. In some embodiments, the pigment used for formulating the water-borne epoxy coating composition is selected from one or more of Ultramarine violet (e.g., silicate of sodium and aluminum containing sulfur), Han Purple ($BaCuSi_2O_6$), cobalt pigments such as Cobalt Violet (e.g., cobaltous orthophosphate), manganese pigments such as Manganese violet($NH_4MnP_2O_7$), Gold pigments such as Purple of Cassius: (e.g., gold nanoparticles suspended in tin dioxide, Ultramarine-PB29) (e.g., a sulfur-containing sodio-silicate Na8-10Al6Si6O24S2-4), Persian blue (e.g., ground Lapis lazuli), Cobalt Blue-PB28, Cerulean Blue-PB35, Egyptian Blue (e.g., calcium copper silicate, $CaCuSi_4O_{10}$), Han Blue (e.g., $BaCuSi_4O_{10}$), Azurite (e.g., cupric carbonate hydroxide $Cu_3(CO_3)_2(OH)_2$), Prussian Blue-PB27 (e.g., ferric hexacyanoferrate $Fe_7(CN)_{18}$), YInMn Blue, Manganese Blue (e.g., Barium manganate(VI) sulfate), Cadmium Green, Cadmium Yellow (e.g., CdS), Chromic oxide (e.g., $Cr_2O_3$), Chromium Chrome green-PG17: chromic oxide ($Cr_2O_3$), Viridian-PG18 (e.g., $Cr_2O_3.H_2O$), Cobalt green (e.g., $CoZnO_2$), Malachite (e.g., $Cu_2CO_3(OH)_2$), Scheele's Green, cupric arsenite (e.g., $CuHAsO_3$), Green earth: also known as terre verte and Verona green (K[(Al,FeIII),(FeII,Mg)]($AlSi_3,Si_4$)$O_{10}$($OH$)$_2$), Orpiment (e.g., $As_2S_3$), Primrose Yellow-PY184 (e.g., $BiVO_4$), Cadmium Yellow-PY37 (e.g., CdS), Chrome Yellow-PY34 (e.g., $CrO_4$), Aureolin or Cobalt Yellow-PY40 (e.g., $K_3Co(NO_2)_6$), Yellow Ochre-PY43 (e.g., $Fe_2O_3.H_2O$), Naples Yellow-PY41, Lead-tin-yellow (e.g., $PbSnO_4$ or $Pb(Sn,Si)O_3$), Titanium Yellow-PY53, Mosaic gold (e.g., $SnS_2$), Zinc Yellow-PY36 (e.g., $ZnCrO_4$), Cadmium Orange-PO20 (e.g., cadmium sulfoselenide), Chrome Orange (e.g., $PbCrO_4$+PbO), Realgar (e.g., $As_4S_4$), Cadmium Red-PR108 (e.g., $Cd_2SSe$), Sanguine, Caput Mortuum, Indian Red, Venetian Red, Oxide Red-PR102, Red Ochre-PR102 (e.g., anhydrous $Fe_2O_3$), Burnt Sienna-PBr7, Minium pigment (e.g., $Pb_3O_4$), Vermilion-PR106 (e.g., cinnabar), mercuric sulfide (HgS), Clay earth pigments (e.g., iron oxides), Raw Umber-PBr7 and burn Umber (e.g., $Fe_2O_3$+$MnO_2$+$nH_2O$+Si+$Al_2O_3$; when calcined (heated) it is referred to as Burnt Umber and has more intense colors), Raw Sienna-PBr7 (e.g., limonite clay), Carbon Black-PBk7, Ivory Black (PBk9), Vine Black-PBk8, Lamp Black-PBk6, Iron pigments, Mars Black-PBk11 (e.g., $Fe_3O_4$), Manganese dioxide (e.g., $MnO_2$), Titanium Black (e.g., $Ti_2O_3$), Antimony White (e.g., $Sb_2O_3$), Barium sulfate-PW5 (e.g., $BaSO_4$), Lithopone (e.g., $BaSO_4$*ZnS), Cremnitz White-PW1 (e.g., $(PbCO_3)_2.Pb(OH)_2$), Titanium White-PW6 (e.g., $TiO_2$), Zinc White-PW4 (e.g., ZnO), 1,2-dihydroxyanthraquinone, Anthoxanthin, Arylide yellow, Azo dyes, Bilin (e.g., bilirubin), soot, Bone char, Carmine (e.g., aluminum salt of carminic acid), Diarylide pigment, Dibromoanthanthrone, Dragon's blood, Gamboge, Indian yellow (e.g., magnesium euxanthate and calcium euxanthate), Indigo dye (e.g., 2,2'-Bis(2,3-dihydro-3-oxoindolyliden), Indigotin), Naphthol AS (e.g., 3-hydroxy-N-phenylnaphthalene-2-carboxamide), Naphthol Red (e.g., 4-(2-(4-carbamoylphenyl)hydrazono)-N-(2-ethoxyphenyl)-3-oxo-3,4-dihydronaphthalene-2-carboxamid), Ommochrome (e.g., metabolites of tryptophan, via kynurenine and 3-hydroxykynurenine), Perinone, Phthalocyanine Blue BN, Phthalocyanine Green G, Pigment violet 23, Pigment Yellow 10, Pigment Yellow 12, Pigment Yellow 13, Pigment Yellow 16, Pigment Yellow 81, Pigment yellow 83, Pigment yellow 139, Pigment yellow 185, Quinacridone, Rose madder (e.g., alizarin and purpurin), Rylene dye, and Tyrian purple (e.g., 6,6'-dibromoindigo). In some embodiments the pigment is titanium dioxide (e.g., $TiO_2$).

As used herein, a defoamer or an anti-foaming agent is a chemical additive that reduces and hinders the formation of foam. The additive can be a formulation of one or more compounds. Some antifoam agents include FOAMASTER® and FOAMSTAR® available from BASF such as FOAMASTER® MO 2134, FOAMASTER® MO 2150, FOAMASTER® NO 2335, FOAMSTAR ED 2521, FOAMSTAR ED 2522, FOAMSTAR ED 2523, FOAMSTAR NO 2306, FOAMSTAR SI2210, FOAMSTAR SI2213, FOAMSTAR SI2216, FOAMSTAR SI2250, FOAMSTAR SI2280, FOAMSTAR SI2293, FOAMSTAR ST 2438, and FOAMSTAR ST 2454. In some embodiments the antifoam agent is FOAMSTAR® ST2438.

As used herein, a "rheology modifier" is a compound or composition added to adjust the rheology of a formulation. For example, rheology modifiers can improve the sag resistance of a coating by rapid but controlled viscosity increase after application, improve transportability and storage of the coating by helping prevent sedimentation of the pigments or other solids within a formulation. In some embodiments, the rheology modifiers can be inorganic such as clays, fumed silicas and speciality clays, such sepiolite, attapulgite and smectites. In some embodiments, the rheology modifiers can be organic, such as cellulosic materials, and synthetic materials, such as hydrophobically modified polyurethanes, hydrophobically modified polyethers, alkali swellable emulsions, and castor oil thixotropes. In some embodiments, BENTONE® DE, a highly beneficiated, hyperdispersible powdered hectorite clay, is used as a rheology modifier.

As used herein, a "filler" or "extender" can be any suitable material, for example, any dry and inert (e.g., chemically inactive) material. Fillers can be added for a variety of reasons, for example, in some embodiments, the filler is added to reduce cost, to alter the strength, weight or appearance of the cast, or to make the resin coating more workable either before or after hardening. In some embodiments, the filler can be selected from the group consisting of: micro spheres such as hollow ceramic microspheres, FILLITE® Glass-Hard-Inert Silicate in the Form of High Strength Hollow Sphere (Tolsa USA inc), NOBLITE® perlite derived microspheres (Noble International SA, La Pin, France), perlite microspheres, plastic microspheres (e.g., phenolic, amino based and vinyl based microspheres), expandable microspheres as for example described in U.S. Pat. No. 3,615,972 which is hereby incorporated by reference and EXPANCEL™ Microspheres (AkzoNobel, US), calcium carbonate, limestone sand, marble dust, magnesium silicates such as talc (e.g., talcum powder), slate powder, silica such as CAB-O-SIL® and CAB-O-SPERSE® fumed silicas (Cabot Corp, US), colloidal silica, aluminum hydroxide, aluminum oxide, barium sulfate ($BaSO_4$) such as Blanc Fixe Micro (Sachtleben Chemie, Germany), metal powders (e.g., brass, copper, aluminum, iron and bronze), fiber fillers, polyethylene fibers such as Poly Fiber II available from Polytek® Development Corp, glass fibers (e.g., milled glass fibers, chopped glass strands), carbon fibers (e.g., milled carbon fibers), walnut shell flour, pecan shell flour, wood flour, corn cob flour, rice hull flour, ground rubber, ground leather, cellulose (e.g., cotton fiber, sisal flocks, flax, hemp and other natural fibers) as well as mixtures of these. In some embodiments, the filler or extender includes talcum powder and barium sulfate.

As used herein, a "corrosion inhibitor" refers to a component (e.g., chemical or composition) that, when added to a formulation, decreases the corrosion rate of a material to which it is applied to. For example, the corrosion inhibitors can decrease the corrosion of a metal surface when a fluid containing the corrosion inhibitor is contacted to the surface. As used herein, a "rust inhibitor" is a corrosion inhibitor such as can be used for preventing corrosion in ferrous surfaces. In some embodiments, the inhibitors are selected from inorganic compounds such as chromates, phosphates or polyphophates, sulfates, sulfites, molybdates, borates, metaborates, phososilicates, silicates and phosphites of Na, K, Zn, Ca, Sr, Ba, Al, Mg, Pb, Cr, Fe, or combinations of these anionic and cationic species. In some embodiments, the inhibitors are organic compounds, such as thiols, derivatives of dithiocarbonic, dithiocarbamic and dithiophosphoric acids. Some examples of organic inhibitors include N-containing heterocyclic mercapto derivatives such as 2-mercaptobenzothiazole (MBT); amines such as hexamine, phenylenediamine, dimethylethanolamine, and their derivatives; ascorbic acid; and benzotriazole. In some embodiments, mixtures and reaction products of the inorganic and organic inhibitors such as $Zn(MBT)_2$ as described in U.S. Pat. No. 6,139,610 which is hereby incorporated by reference. In some embodiments, the corrosion inhibitor is zinc phosphate or a zinc organic complex such as NALXIN® FA 579 (Elementis plc, US).

As used herein, a "dispersant" or a "dispersing agent" is either a non-surface active or a surface-active compounds added to a suspension, such as a colloid, to improve the separation of particles and to prevent settling, agglomeration, flocking and clumping. Dispersing agents can be chosen depending on the formulation and can include compounds that provide steric or electrostatic stabilization of particles in the formulation. For example, in some embodiments, dispersing agents are nonionic, anionic or cationic surface active polymers or surfactants such as quaternary ammonia salts and alkylpolyamines (cationic); polyacrylic acids and sulfonated organic substances (anionic); nonionic or mainly nonionic substances having hydrophilic groups (e.g. ethylene oxide and propylene oxide units). In some embodiments, the dispersant is a polyacrylic acid such as DISPEX® CX 4320 (BASF, Germany).

Curing refers to the toughening or hardening of a polymer material by cross-linking of polymer chains, brought about by electron beams, UV radiation, heat, chemical additives or combinations of these. As used herein, a "curing agent" is a chemical compound or composition added to a resin composition to toughen or harden the composition, such as when it is coated on a surface. In some embodiments, the curing agent is one or more of aliphatic amines, aromatic amines, tertiary amines, primary amines, polyamine, polyamine epoxy-resin adduct, ketimine, polyamide resin, imidazoles, polymercaptan, polysulfide resin, aromatic anhydrides, alicyclic anhydrides, aliphatic anhydrides, latent curing agents and UV/light curing agents. Without limitation, a compound selected from the following can be used in some embodiments of the formulations described herein: diphenyliodonium hexafluorophosphate, triphenylsulfonium hexafluorophosphate, diethylenetriamine, triethylenetetramine, tetraethylenepentamine, diproprenediamine, diethylaminopropylamine, hexamethylenediamine, N-aminoethylpiperazine, menthane diamine, isophoronediamine, m-xylenediamine, metaphenylene diamine, diaminodiphenylmethane, diaminodiphenylsulfone, piperidine, N,N-dimethylpiperidine, triethylenediamine, 2,4,6-tris (dimethylaminomethyl) phenol, benzyldimethylamine, 2-(dimethylaminomethyl) phenol, 2-methylimidazole, 2-ethyl-4-methylimidazole, 1-cyanoethyl-2-undecylimidazolium trimellitate, phthalic anhydride, trimellitic anhydride, pyromellitic anhydride, benzophenone tracarboxylic anhydride, ethylene glycol bistrimellitate, glycerol tristrimellitate, maleic anhydride, tetrahydrophthalic anhydride, methyltetrahydrophthalic anhydride, endomethylene tetrahydrophthalic anhydride, methylendomethylene tetrahydrophthalic anhydride, methylbutenyl tetrahydrophthalic anhydride, dodecenyl succinic anhydride, hexahydrophthalic anhydride, hexahydro-4-methylphthalic anhydride, succinic anhydride, methylcyclohexene dicarboxylic anhydride, alkylstyrene-maleic anhydride copolymer, chlorendic anhydride, polyazelaic polyanhydride, $BF_3$-amine complex, organic-acid hydrazide, and dicyandiamide. In some embodiments, the curing agent is a polyamine adduct such as EPIKURE™ Curing Agent 8530-W-75 (Hexion Inc, Columbus, Ohio).

In some embodiments, the water-borne epoxy coating composition is formulated as a two or more-part composition. For example, a first part of a multi-part composition can include the epoxy resin (e.g., part A) and a second part (e.g., part B) can include a curing agent. In some embodiments, the water-borne epoxy coating composition including two or more-part composition uses one or more of the additives described above, e.g., one or more of a pigment, an anti-foaming agent, a rheology modifier, a filler, an extender, a corrosion inhibitor, and water, wherein the additives can be portioned separately into the parts (e.g., part A and B).

As used herein, "hardness" refers to a measure of the resistance to localized plastic deformation induced by either mechanical indentation or abrasion. Hardness can be measured by different methods depending on the material. For example, the Mohs scale of mineral hardness is based on the ability of one natural sample of mineral to scratch another mineral visibly, while hardness of polymers (rubbers, plastics) is usually denoted as a Shore hardness and measured using a durometer, which measures the depth of an indentation in the material created by a given force on a standardized presser foot. Another hardness scale is based on scratching a surface with a pencil as described in ASTM Test Method D 3363-00 (Standard Test Method for Film Hardness by Pencil Test) and provides a hardness from, from example, soft to hard of 9B, 8B, 7B, 6B, 5B, 4B, 3B, 2B, B, HB, F, H, 2H, 3H, 4H, 5H, 6H, 7H, 8H, 9H (9B softest, 9H hardest). In this method the test specimen (e.g., a coated panel) is placed on a firm horizontal surface. A pencil calibrated to one of the hardness' (e.g., 9B to 9H) is held firmly against the film at a 450 angle with the point away from the operator, and is pushed away from the operator in a 6.5-mm (¼-in.) stroke. The test procedure is started with the hardest pencil and continued down the scale of hardness until the pencil that will not cut into or gouge the film is reached. The Pencil Hardness is selected by the hardest pencil that doesn't scratch the surface. In some embodiments, the water-borne epoxy coating composition can form a coating with a hardness greater than about 9B (e.g., greater than 8B, greater than 7B, greater than 6B, greater than 5B, greater than 4B, greater than 3B, greater than 2B, greater than B).

As used herein, "adhesion" refers to the force of attraction that causes two different substances to join. For example, coating adhesion refers to the minimum force required to completely affix a layer of a coating resin formulation to a metal substrate. A more durable and chemically resistant coating possesses a greater the degree of coating adhesion. The adhesion can be quantified by ASTM Test Method D3359-09 which provides an adhesion scale from least to most adhesive of 0, 1, 2, 3, 4, or 5 degrees respectively. The methods assess the adhesion of coating films to metallic substrates by applying and removing a pressure-sensitive tape over cuts made in the film. The test method includes two methods, Test Method A and Test Method B. In Test Method A, an X-cut is made through the film to the substrate, and pressure-sensitive tape is applied over the cut and then removed, and adhesion is assessed qualitatively on the 0 to 5 degree scale. For the A method, the adhesion is rated as: 5A no peeling or removal, 4A trace peeling or removal along incisions or at their intersection, 3A jagged removal along incisions up to 1.6 mm (1/16 in.) on either side, 2A jagged removal along most of incisions up to 3.2 mm (⅛ in.) on either side, 1A removal from most of the area of the X under the tape, and 0A Removal beyond the area of the X. In Test Method B, a lattice pattern with either six or eleven cuts in each direction is made in the film to the substrate, after which a pressure-sensitive tape is applied over the lattice and then removed. The adhesion is evaluated by comparison with descriptions and illustrations. For the B method the adhesion is rated as: 5B The edges of the cuts are completely smooth, none of the squares of the lattice is detached; 4B small flakes of the coating are detached at intersections, less than 5% of the area is affected; 3B small flakes of the coating are detached along edges and at intersections of cuts, the area affected is 5 to 15% of the lattice; 2B the coating has flaked along the edges and on parts of the squares, the area affected is 15 to 35% of the lattice; 1B the coating has flaked along the edges of cuts in large ribbons and, whole squares have detached, the area affected is 35 to 65% of the lattice; and, 0B flaking and detachment worse than Grade 1. In some embodiments, the adhesion is greater than 4B, for example greater than 5B, wherein the test uses ASTM Test Method D3359-09-Method B.

As used herein, "corrosion" refers to a process which degrades a material. With respect to a metal, it refers to reactions which converts the metal to a more chemically-stable form, such as its oxide, hydroxide, or sulfide. Corrosion is usually a gradual destruction of materials and since the process is often slow (e.g., taking months or years) accelerated testing is often used to assess corrosion or corrosion resistance. A salt spray (or salt fog) test is a commonly used corrosion test method, used to check corrosion resistance of materials and surface coatings. Usually, the materials to be tested are metallic (although stone, ceramics, and polymers may also be tested) finished with a surface coating which is intended to provide a degree of corrosion protection to the underlying metal. Salt spray testing is an accelerated corrosion test that produces a corrosive attack to coated samples in order to evaluate (mostly comparatively) the suitability of the coating for use as a protective finish. The appearance of corrosion products (rust or other oxides) is evaluated after a pre-determined period of time. Test duration depends on the corrosion resistance of the coating; generally, the more corrosion resistant the coating is, the longer the period of testing before the appearance of corrosion/rust. There are several standardized salt spray tests including ASTM Test Method B117 and other important relevant standards are ISO9227, JIS Z 2371 and ASTM G85. This test is a subjective test and relies on different ratings for a given test and for different testing environments (e.g., different laboratories). For example, a test might rate the number of corrosion spots, amount of pitting, loss of coating material, discoloration/change of color, and mass change (e.g., loss due to material loss, or gain due to oxidation) of test samples. The test can also include providing a cut through a coating to the substrate as described by ASTM Test Method D1654 if the desire is to determine the development of corrosion from an abraded area in the coating. Therefore, the test can be a comparative test of corrosion resistance between differing coating compositions, where a first coating on a substrate can be rated as better (e.g., improved, more corrosion resistant, higher corrosion resistance, less corroded) than a second or third coating on the same kind of substrate if in there are fewer corrosion spots, less pitting, less loss of coating material, less discoloration/change of color, less mass change, a decrease in some other evidence of corrosion, or combinations of these criteria, in the first coated substrate than in the second or third coated substrate. The rating can be, for example good, normal or poor corrosion resistance. In some embodiments, the corrosion resistance of coating made using a polymer having a structure of a reaction product of (A) a monomer of epoxy having at least two epoxide groups per molecule, (B) a polyether monoamine, and (C) an epoxidized oil (e.g., ESBO, ECO) as described herein is better than the corrosion resistance of coatings not using one or more of these components.

As used herein, "impact resistance" refers to the resistance of a material to degradation (e.g., cracking, penetration into, or distortion from the original shape) due to it being struck by another material. Impact resistance of an organic coating, for example, coatings made with the epoxy resins describe herein, can be tested using ASTM Test Method D2794. The method covers a procedure for rapidly deforming by impact a coating film and its substrate and for evaluating the effect of such deformation. The coatings under test are applied to four or more suitable thin metal panels. After the coatings have cured, a standard weight is dropped a distance to strike an indenter that deforms the coating and the substrate. By gradually increasing the distance the weight drops, generally by 1 inch (25 mm) at a time, the point at which failure usually occurs can be determined. Films often fail by cracking, which can be made more visible by the use of a magnifier, application of a development agent such as a copper sulfate ($CuSO_4$) solution on steel, by the use of a pin hole detector, or by a tape-pull test to determine the amount of coating removed. The test method specifies that the test method should be restricted to testing in only one laboratory when numerical values are used and inter-laboratory agreement is improved when ranking is used in place of numerical values. The test can also be used to compare samples coated with different water-borne epoxy coating composition by using the same conditions (e.g., weight and height of impactor) on the test sample to see if one resists cracking or loss of coating from the coated film on the thin metal panel better than another sample with a different coating. In some embodiments, the impact resistance of coatings made using a polymer having a structure of a reaction product of (A) a monomer of epoxy having at least two epoxide groups per molecule, (B) a polyether monoamine, and (C) an epoxidized oil (e.g., ESBO, ECO) as described herein is better than the impact resistance of coatings not using one or more of these components.

The present invention is more detailed illustrated by the example embodiments as below. While example embodiments are disclosed herein, it should be understood that they are used for illustrating the present invention, not for limiting the scope of the present invention.

EXAMPLES

Example 1—The Epoxy Resin S1.1 and the Aqueous Dispersion S1.2

Figure 2:
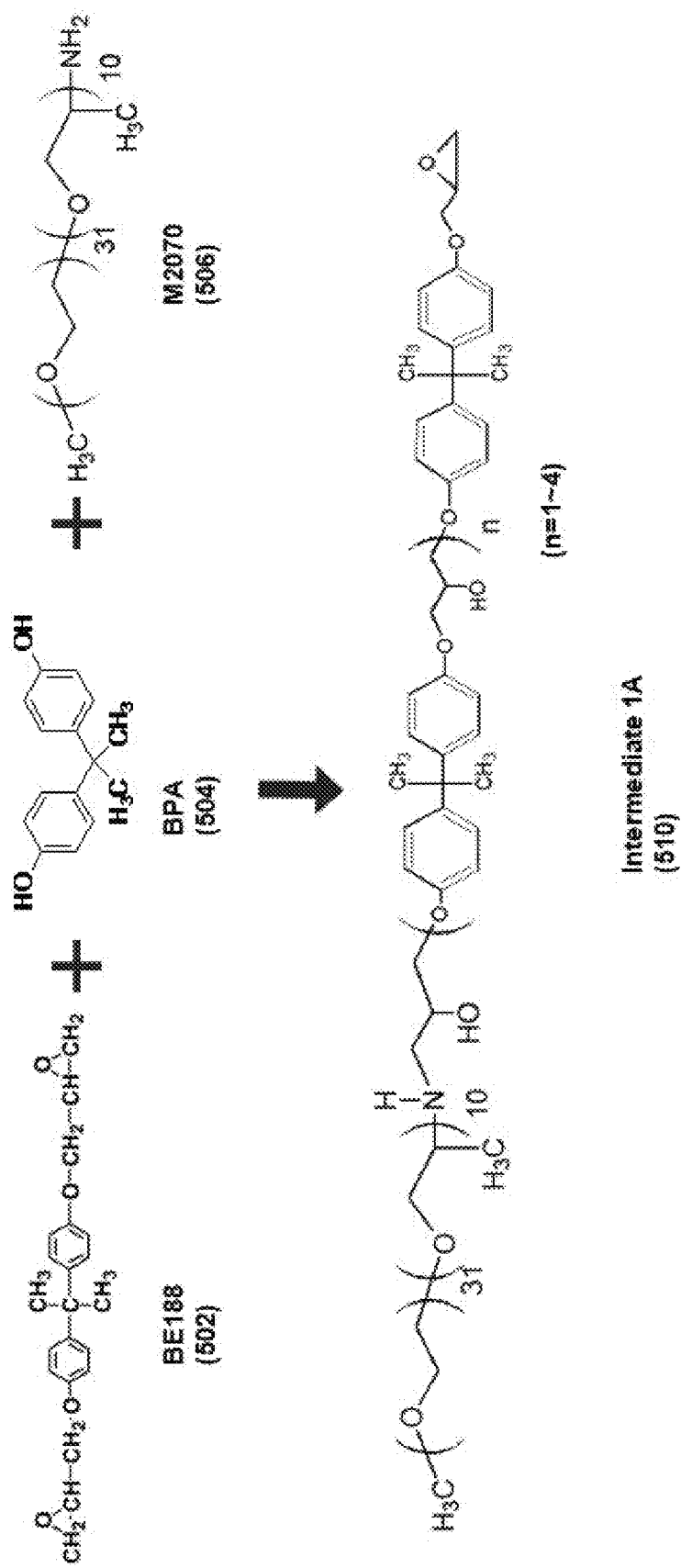
FIG. 2 shows a chemical reaction scheme of Example 1 of the present invention for producing an intermediate 1A which is the reaction product of Bisphenol-A Diglycidyl Ether (used as (A1)), Bisphenol-A (BPA) (used as (D)), and polyether monoamine (used as (B)).

As depicted by FIG. 2, 423.94 g of Bisphenol-A Diglycidyl Ether used as (A1) (BE188, CHANG CHUN PLASTICS CO., LTD) (502), 128.06 g BPA used as (D) (CHANG CHUN PLASTICS CO., LTD) (504), and 86.55 g of polyether monoamine used as (B) (JEFFAMINE® M-2070, Huntsman Corporation) (506), all >99.9% purity, were mixed under an inert (e.g., nitrogen) atmosphere in a round bottomed flask, equipped with a heater (e.g., a heating mantle) and an agitator (e.g., a propeller mixer or a stir bar can be used). The mixture of (A1), (D), and (B) was stirred and heated to about 85° C. for about 15 minutes and then 0.31 g of triphenylphosphine used as a catalyst was added. The temperature was increased to 150° C. and the reaction was monitored and allowed to proceed until the epoxide equivalent amount was about 520 g/eq (e.g., about 90 minutes). This provided poly aromatic amino glycidyl ether (Intermediate 1A) (510).

Figure 3:
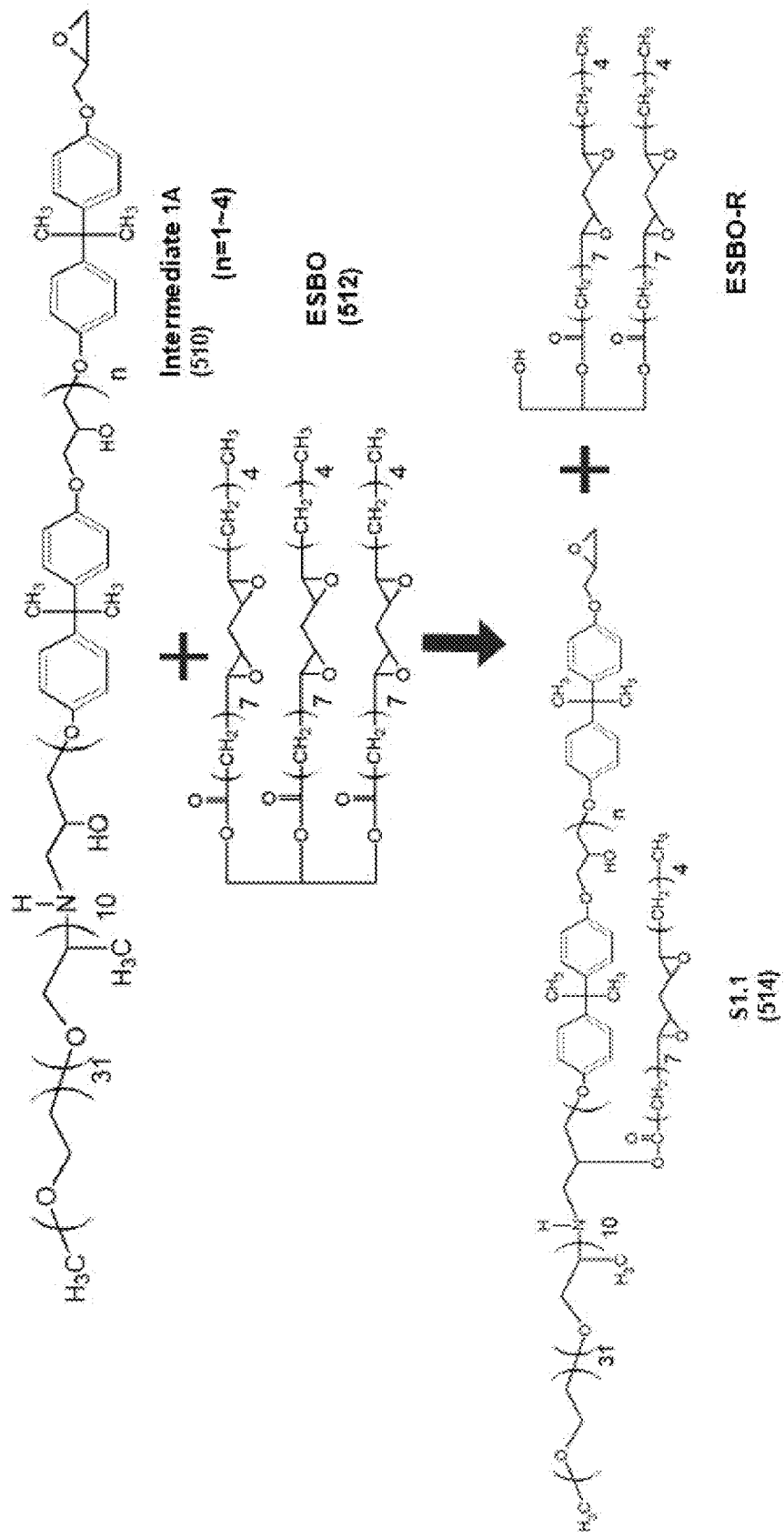
FIG. 3 shows a chemical reaction scheme of Example 1 of the present invention for producing the epoxy resin using the intermediate 1A and epoxidized soybean oil (ESBO) (used as (C)).

As depicted in FIG. 3, Intermediate 1A (510) was further reacted with 60 g of ESBO (512) used as (C) (CHANG CHUN PLASTICS CO., LTD, >99.9%). The reaction with ESBO was allowed to proceed at 150° C. under constant stirring until the epoxy equivalent was increased to about 520 g/eq (e.g., for about 90 more minutes), affording a reaction mixture product as the epoxy resin S1.1 (514) and at least 5% of the residue from ESBO (i.e., ESBO-R) having a combined mass of 647.53 g.

For further modification, the reaction mixture (S1.1 and ESBO-R) was then cooled to about 100° C. and mixed with 48.9 g of propylene glycol methyl ether (PGME). Optionally, the reaction mixture (S1.1 and ESBO-R) are allowed to cool to room temperature and set aside for a time (e.g., overnight) prior to adding heating the mixture to 100° C. and adding PGME. The mixture of S1.1 and PGME is maintained at 100° C. and 553.15 g of water is added. The mixture is then allowed to cool to room temperature under continuous stirring. This provides the aqueous dispersion (also called as the water-borne epoxy resin) S1.2.

Figure 4:
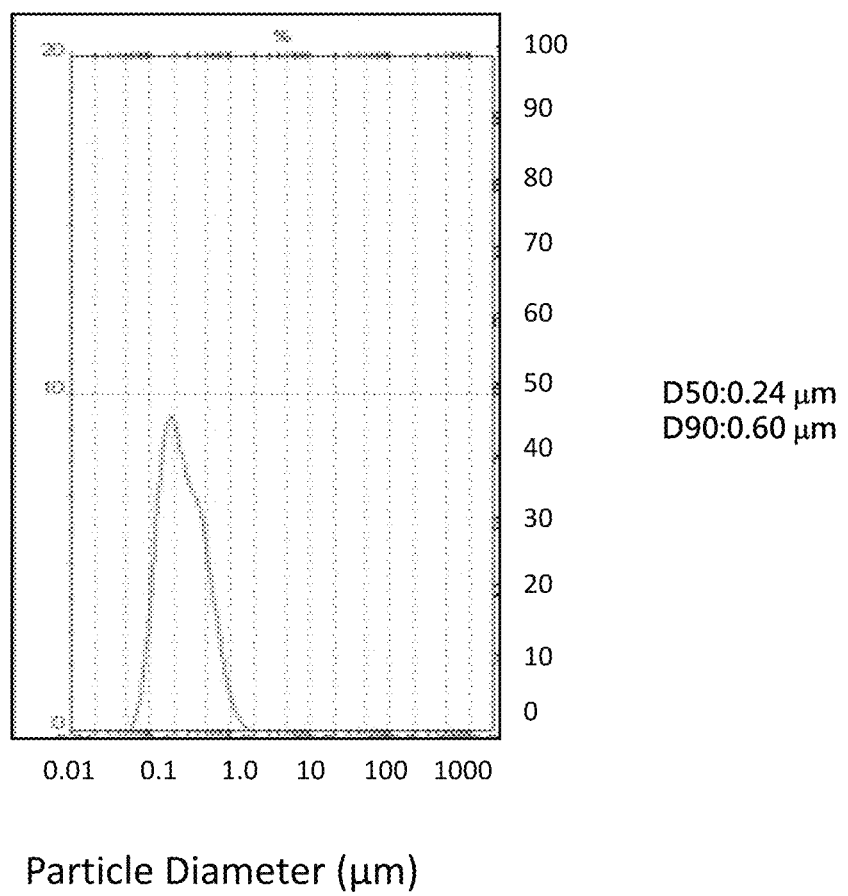
FIG. 4 is a graph showing the particle sized distribution for the epoxy resin of Example 1 of the present invention.

The particle size distribution of S1.2 as measured by a MASTERSIZER 2000™ particle size analyzer (Malvern Instruments Inc., Westborough Mass.) was $D_{50}$ 0.24 μm and $D_{90}$ 0.6 μm. For the test, the test sample of S1.2 was diluted with water (resin:water=1:10), and about 5 ml of the diluted solution was added slowly and dropwise into the analysis tank. The particle size analysis was then run to provide the data. A plot of the measured particle size distribution is shown by FIG. 4.

Figure 5:
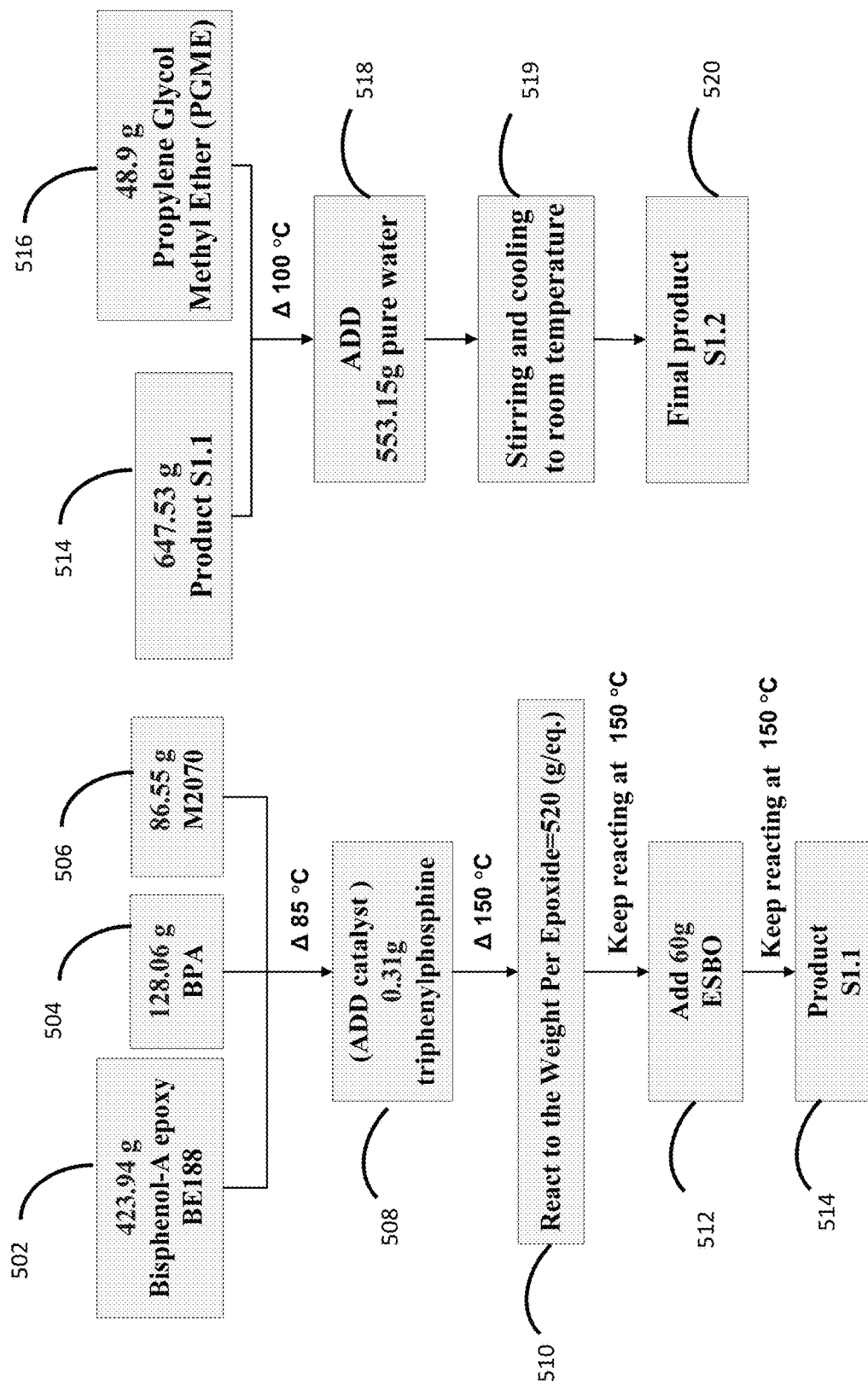
FIG. 5 is a flow diagram of Example 1 of the present invention showing steps and compounds used for making the epoxy resin S1.1 and the aqueous dispersion S1.2.

FIG. 5 is a flow diagram showing the experimental steps and compositions used for preparing S1.2 described above. BE188 (502) used as (A1), BPA (504) used as (D), and JEFFAMINE® M-2070 (506) used as (B) are mixed and heated to 85° C. Triphenylphosphine used as a catalyst (508) is added and the heat is increased to 150° C., until the epoxide equivalent amount is about 520 g/eq providing an intermediate product (510). ESBO used as (C) is added (512) and the reaction is continued at 150° C., to provide the product as the epoxy resin S1.1 (514) and ESBO-R mixture. The reaction is continued by mixing the epoxy resin S1.1 (514) and ESBO-R mixture with PGME (516) at 100° C. and then dispersing the mixture in water (518). The dispersion is stirred and cooled to room temperature (519) providing the aqueous dispersion (i.e., water-borne epoxy resin) S1.2 (520).

Example 2—the Epoxy Resin S2.1 and the Aqueous Dispersion S2.2

The epoxy resin S2.1 and the aqueous dispersion S2.2 was prepared using the methods on components previously described in Example 1 except that JEFAMINE® M-2095 was used instead of M-2070 (used as (B)) in the first step.

Figure 6:
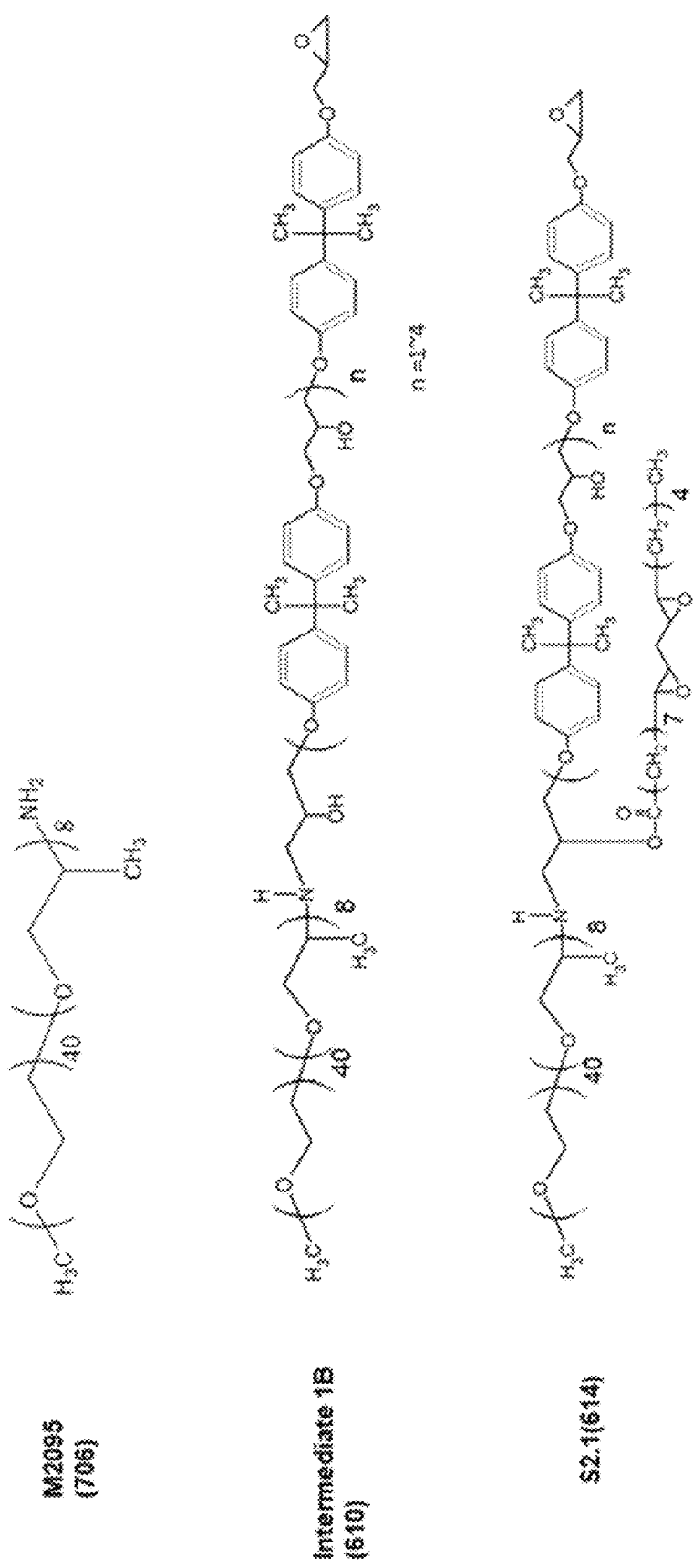
FIG. 6 shows the chemical structures of a polyether monoamine M2095 (used as (B)), an intermediate 1B and a reaction product of the intermediate 1B with ESBO (used as (C)) of Example 2 of the present invention.

Accordingly, 423.94 g of BE188 used as (A1), 128.06 g BPA used as (D), and 86.55 g of polyetheramine JEFFAMINE® M-2095 (706) used as (B), shown in FIG. 6, were mixed and reacted as previously described using 0.31 g of triphenylphosphine. This provided the corresponding poly aromatic amino glycidyl ether Intermediate 1B (610), shown in FIG. 6, which was further reacted with 60 g of ESBO used as (C), as previously described, and affording a reaction mixture product as the epoxy resin S2.1 (614) also shown in FIG. 6, and ESBO-R having a combined mass of 647.53 g. The reaction mixture was mixed with 48.9 g PGME and dispersed in 553.15 g of water as previously described. This provides the aqueous dispersion (also called as water-borne epoxy resin) S2.2.

The particle size distribution of the aqueous dispersion S2.2 was measured and shown to be in the targeted range of $D_{50}$ greater than about 0.01 µm and less than about 0.8 µm, and $D_{90}$ greater than about 0.2 µm and less than about 10 µm.

Figure 7:
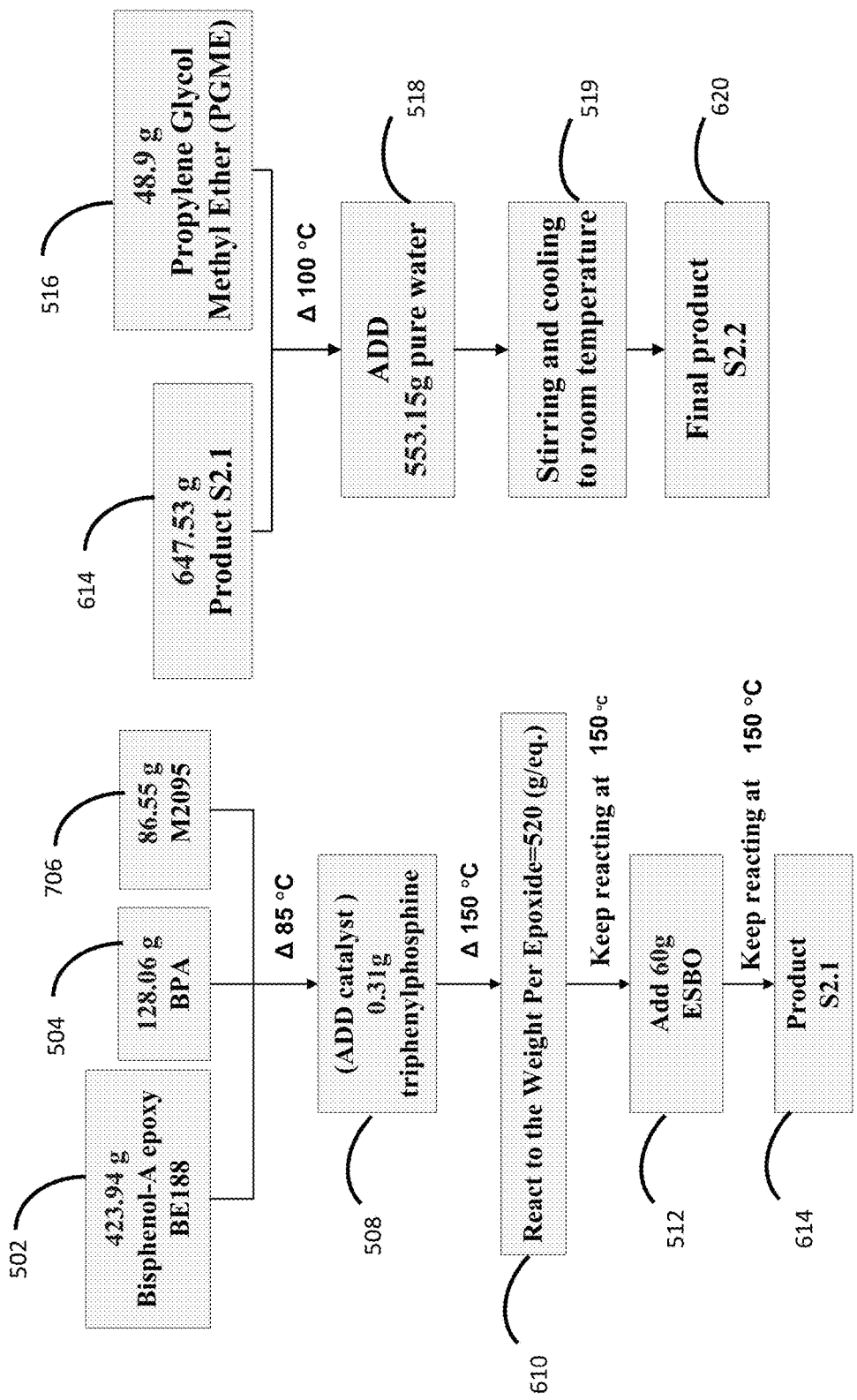
FIG. 7 is a flow diagram of Example 2 of the present invention showing steps and compounds used for making the epoxy resin S2.1 and the aqueous dispersion S2.2.

FIG. 7 is a flow diagram showing the experimental steps and compositions used for preparing the aqueous dispersion S2.2 described above. BE188 (502) used as (A1), BPA (504) used as (D), and JEFFAMINE® M-2095 (706) used as (B) are mixed and heated to 85° C. Triphenylphosphine used as a catalyst (508) is added and the heat is increased to 150° C., until the epoxide equivalent amount is about 520 g/eq, providing an intermediate product (610). ESBO used as (C) is added (512) and the reaction is continued at 150° C., to provide the product as the epoxy resin S2.1 (614) and ESBO-R mixture. The reaction is continued by mixing the epoxy resin S2.1 (614) and ESBO-R mixture with PGME (516) at 100° C. and then dispersing the mixture in water (518). The dispersion is stirred and cooled to room temperature (519) providing the aqueous dispersion (i.e., water-borne epoxy resin) S2.2 (620).

Example 3—the Epoxy Resin S3.1 and the Aqueous Dispersion S3.2

The epoxy resin S3.1 and the aqueous dispersion S3.2 was prepared using the methods and components as previously described in Example 1 except that ECO was used instead of ESBO (used as (C)).

Figure 8:
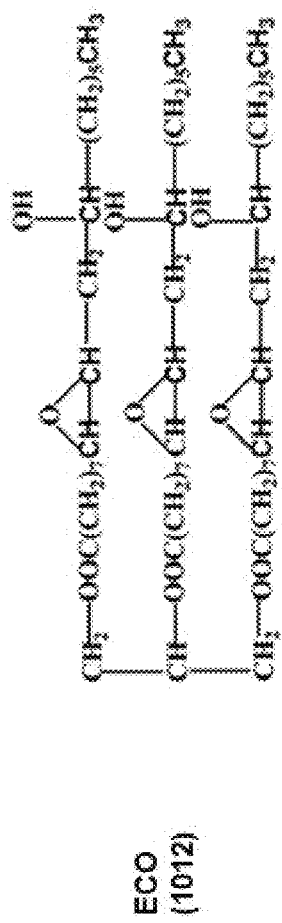
FIG. 8 shows the chemical structures of epoxidized castor oil (ECO) (used as (C)), a residue of ECO (ECO-R), and the epoxy resin S3.1 of Example 3 of the present invention.
Figure 8:
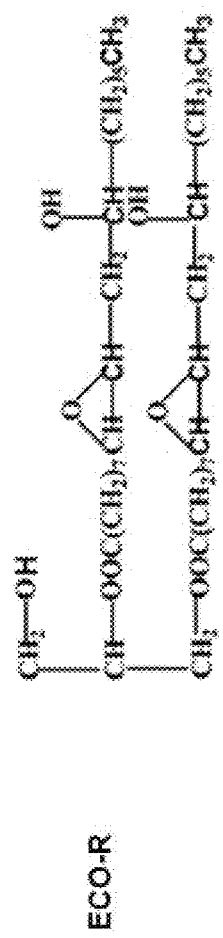
Figure 8:
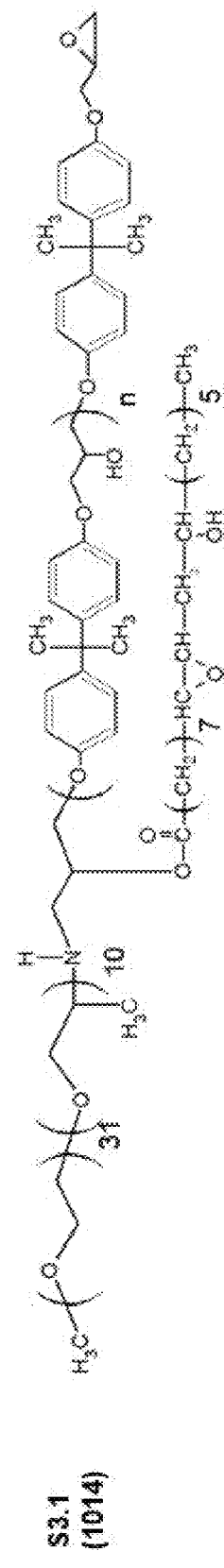

Accordingly, 423.94 g of BE188 used as (A1), 128.06 g BPA used as (D), and 86.55 g of polyetheramine JEFFAMINE® M-2070 used as (B), all >99.9% purity, were mixed and reacted as previously described using 0.31 g of triphenylphosphine. This provided the corresponding poly aromatic amino glycidyl ether (Intermediate 1A) which was further reacted with 60 g of ECO used as (C), affording a reaction mixture product as the epoxy resin S3.1 and the residue from ECO, ECO-R, having a combined mass of 647.53 g. The reaction mixture was mixed with PGME and dispersed in water as previously described. The representative structures, S3.1 (1014), ECO (1012), and ECO-R are shown in FIG. 8.

Figure 9:
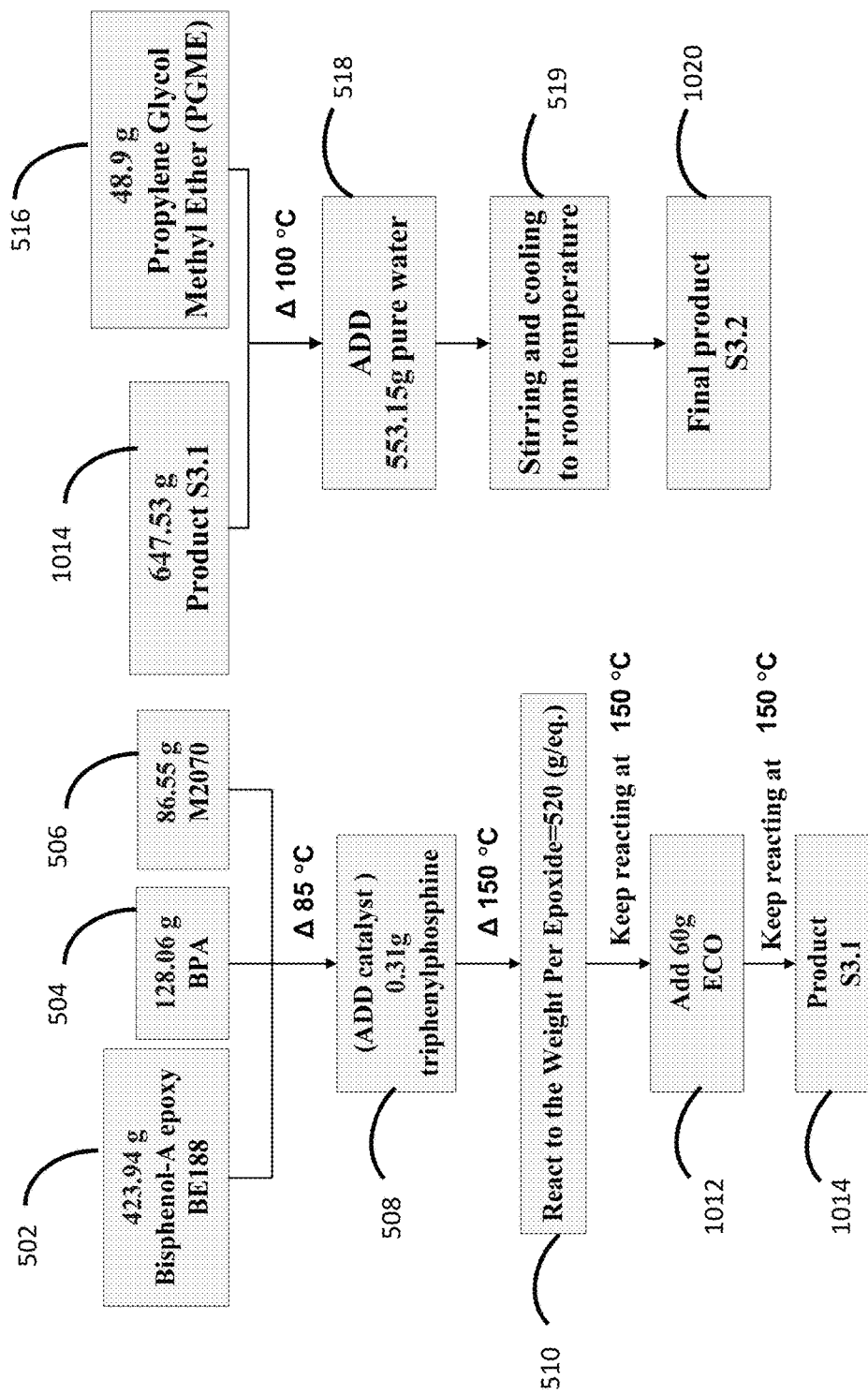
FIG. 9 is a flow diagram of Example 3 of the present invention showing steps and compounds used for making the epoxy resin S3.1 and the aqueous dispersion S3.2.

FIG. 9 is a flow diagram showing the experimental steps and compositions used for preparing the aqueous dispersion S3.2 described above. BE188 (502) used as (A1), BPA (504) used as (D), and JEFFAMINE® M-2070 (506) used as (B) are mixed and heated to 85° C. Triphenylphosphine used as a catalyst (508) is added and the heat is increased to 150° C., and the reaction is allowed to continue until the epoxide equivalent amount is about 520 g/eq, providing an intermediate product (510). ECO used as (C) is added (1012) and the reaction is continued at 150° C., to provide the product as the epoxy resin S3.1 (1014) mixed with ECO-R. The reaction is continued by mixing the epoxy resin S3.1 (1014) and ECO-R mixture with PGME (516) at 100° C. and then dispersing the mixture in water (518). The dispersion is stirred and cooled to room temperature (519) providing the aqueous dispersion (also called as water-borne epoxy resin) S3.2 (1020).

Example 4—The Epoxy Resin S4.1 and the Aqueous Dispersion S4.2

The epoxy resin S4.1 and the aqueous dispersion S4.2 was made using methods and components as previously described in Example 1 except that initially a two component reaction was used.

Figure 10:
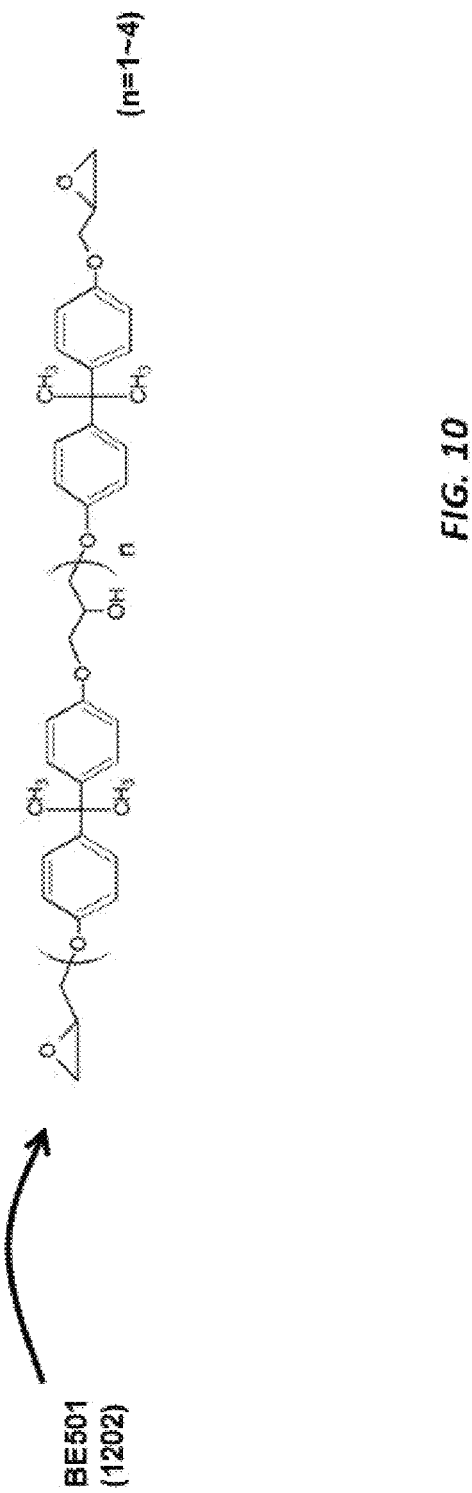
FIG. 10 shows the chemical structure of the BPA epoxy oligomer BE501 (used as (A)) of Example 4 of the present invention.

Accordingly, 555.96 g of solid bisphenol-A epoxy oligomer BE501 (1202) used as (A) (CHANG CHUN PLASTICS CO., LTD, >99%) was combined with 86.55 g Jefamine® M2070 used as (B). Optionally, the BE501 can be pre-melted for convenience, since it begins softening at around 40-50° C. The mixture of (A) and (B) was stirred and heated using 0.31 g of triphenylphosphine used as a catalyst as previously described providing the poly aromatic amino glycidyl ether (Intermediate 1A). The reaction with ESBO used as (C) to provide a reaction mixture product containing the epoxy resin S4.1 is as previously described, as is the dispersion steps with PGME and water to provide the product as the aqueous dispersion (also called as waterborne epoxy resin) S4.2. The representative structure of BE501 (1202) is shown by FIG. 10. In this embodiment, the epoxy resin S4.1 is the same as S1.1; and the aqueous dispersion S4.2 is the same as S1.2.

Figure 11:
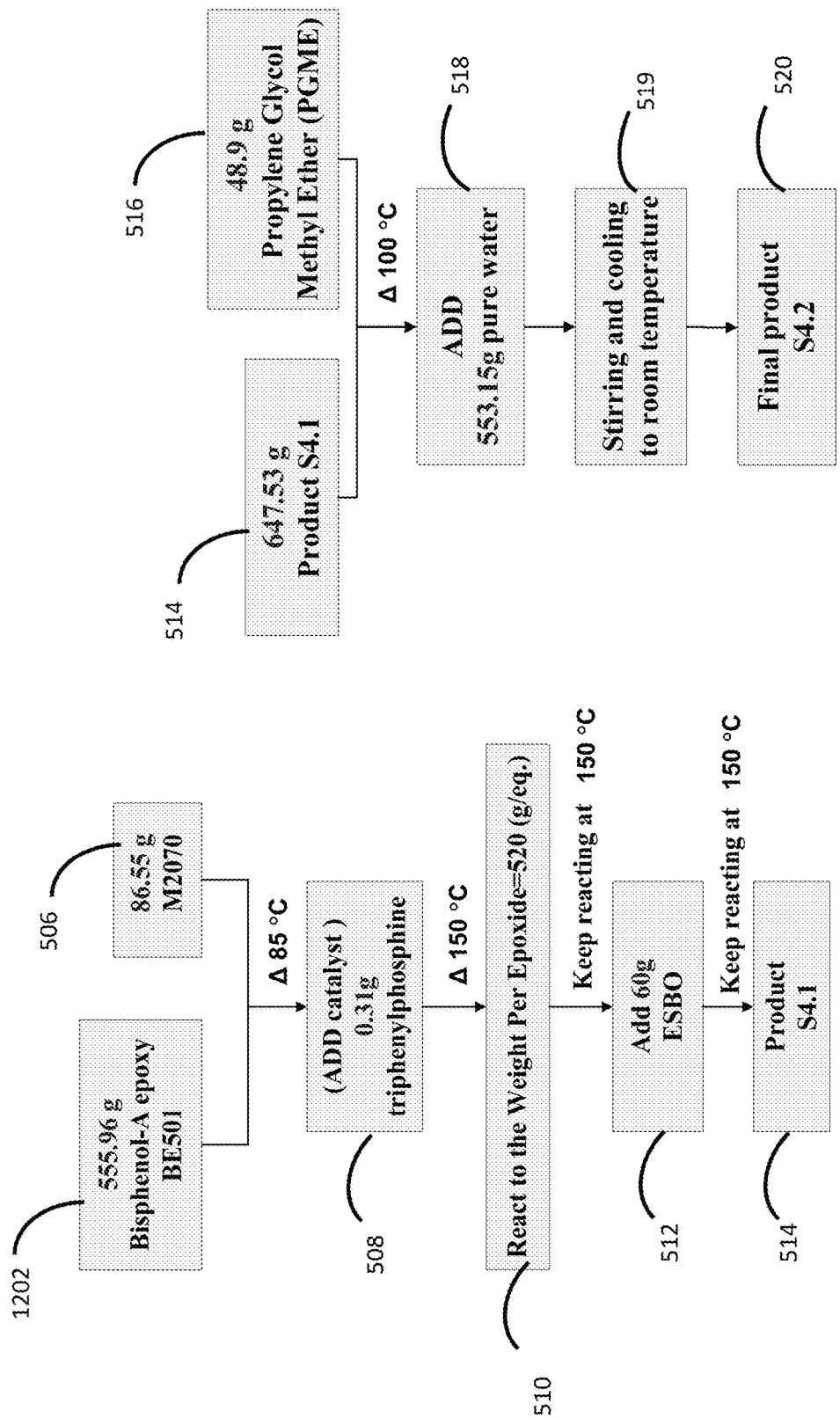
FIG. 11 is a flow diagram of Example 4 of the present invention showing steps and compounds used for making the epoxy resin S4.1 and the aqueous dispersion S4.2.

FIG. 11 is a flow diagram showing the experimental steps and compositions used for preparing the epoxy resin S4.2 described above. Bisphenol-A epoxy oligomer BE501 (1202) used as (A) and JEFFAMINE® M-2070 (506) used as (B) are mixed and heated to 85° C. Triphenylphosphine used as a catalyst (508) is added and the heat is increased to 150° C., and the reaction is continued until the epoxide equivalent amount is about 520 g/eq providing an intermediate product (510). ESBO used as (C) is added (512) and the reaction is continued at 150° C., to provide the reaction mixture product containing the epoxy resin S4.1 (same as S1.1, 514). The reaction is continued by mixing the reaction mixture product containing the epoxy resin S1.1 (514) with PGME (516) at 100° C. and then dispersing the mixture in water (518). The dispersion is stirred and cooled to room temperature (519) providing the aqueous dispersion S4.2 (same as S1.2, 520).

Example 5—The Epoxy Resin C1.2 and the Aqueous Dispersion C 1.3

Figure 12:
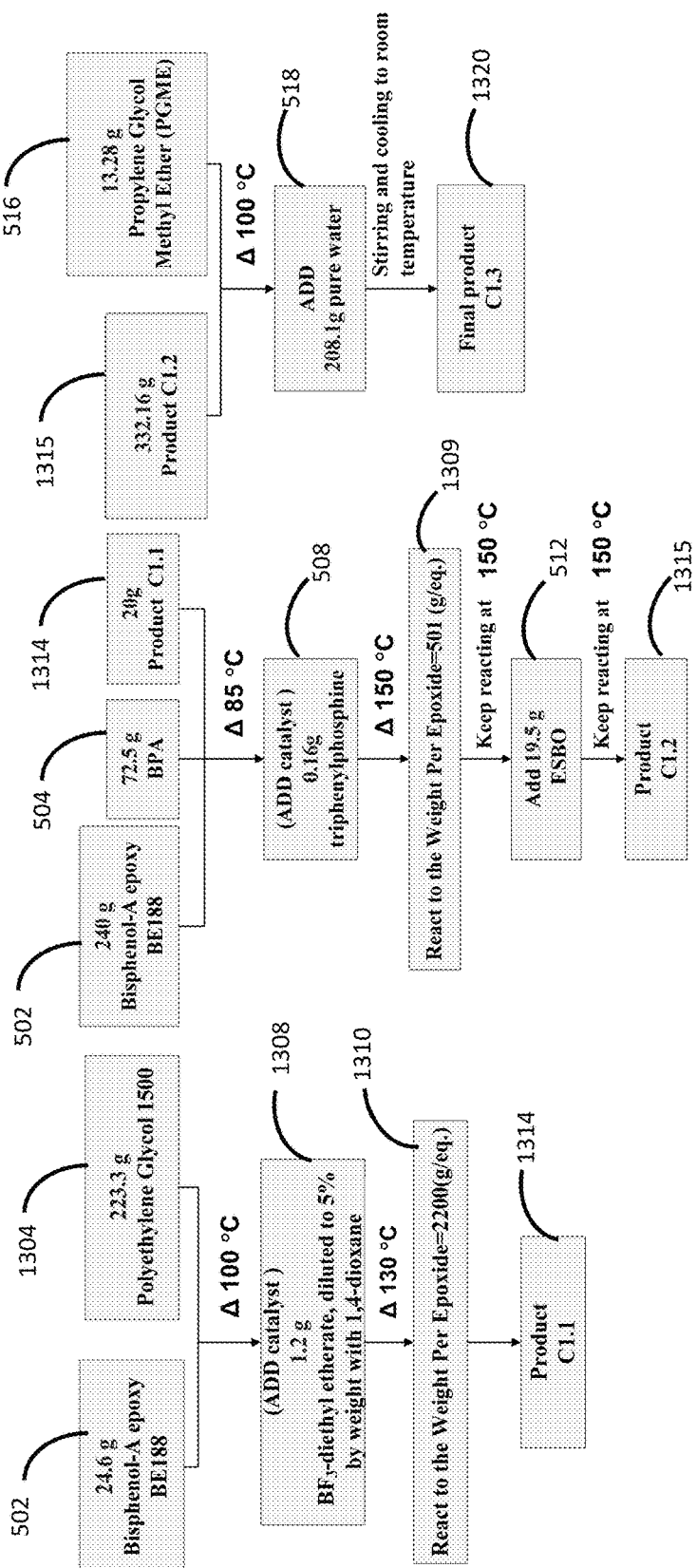
FIG. 12 is a flow diagram of Example 5 of the present invention showing steps and compounds used for making the epoxy resin C1.2 and the aqueous dispersion C1.3.

Example 5 is set as a comparative example for Examples 1 to 4. FIG. 12 is a flow diagram showing experimental steps and compositions used in making the epoxy resin C1.2 (1315) and the aqueous dispersion $C_{1.3}$ (1320). Methods and components are as previously described for Examples 1-4 except as noted here. A charge of 24.6 g of BE188 (502), 223.3 g of Polyethylene Glycol 1500 (PEG1500) (1304), were mixed in a round bottom flask equipped with a heater and agitator under a nitrogen atmosphere. The mixture was homogenized and heated to 100° C. for about 15 min after which 1.2 g of BF$_3$-diethyl etherate (1308) (5 wt % in 1,4-dioxane) was added. The temperature was raised to 130° C. and maintained with stirring until an epoxy equivalent of about 2200 g/eq was reached (1310) (e.g., about 90 min). This provided 20 g of product C1.1 (1314) which is a copolymer of bisphenol and PEG 1500. This intermediate product was cooled to 85° C. or room temperature e.g. cooled to room temperature and left for a time such as overnight before continuing the preparation.

Subsequently, to the C1.1 (1314) was added 240 g BE188 (502) and 72.5 g BPA (504). While maintaining a temperature of 85° C., the mixture was homogenized and 0.16 g of triphenylphosphine catalyst was added (508) after which the temperature was increased to 150° C. The reaction was allowed to proceed for a time until the epoxide equivalent amount was about 501 g/eq (1309) (e.g., about 90 min). Still maintaining the 150° C. temperature and mixing, 19.5 g of ESBO was added (512) and allowed to react (e.g., for about 90 min). This provided about 332.16 g of a reaction mixture product containing the epoxy resin C1.2 (1315).

The reaction mixture product containing the epoxy resin C1.2 was then mixed with PGME (516) at 100° C. and mixed prior to addition of 208.1 g water (518). The mixture was stirred and cooled to room temperature providing the aqueous dispersion (also called as water-borne epoxy resin) C1.3 (1320).

In contrast to Examples 1-4, no polyether amine (M-2070 or M-2095) was used in this preparation and the more reactive catalyst BF3-diethyle ether/dioxane was used in place of the milder triphenylphosphine catalyst to ensure reaction completion in (1308). This product and method for preparation is similar to water-borne epoxy resins described in U.S. Pat. No. 9,346,910, the entire disclosure which is hereby incorporated by reference.

Example 6—the Epoxy Resin C2.1 and the Aqueous Dispersion C2.2

Figure 13:
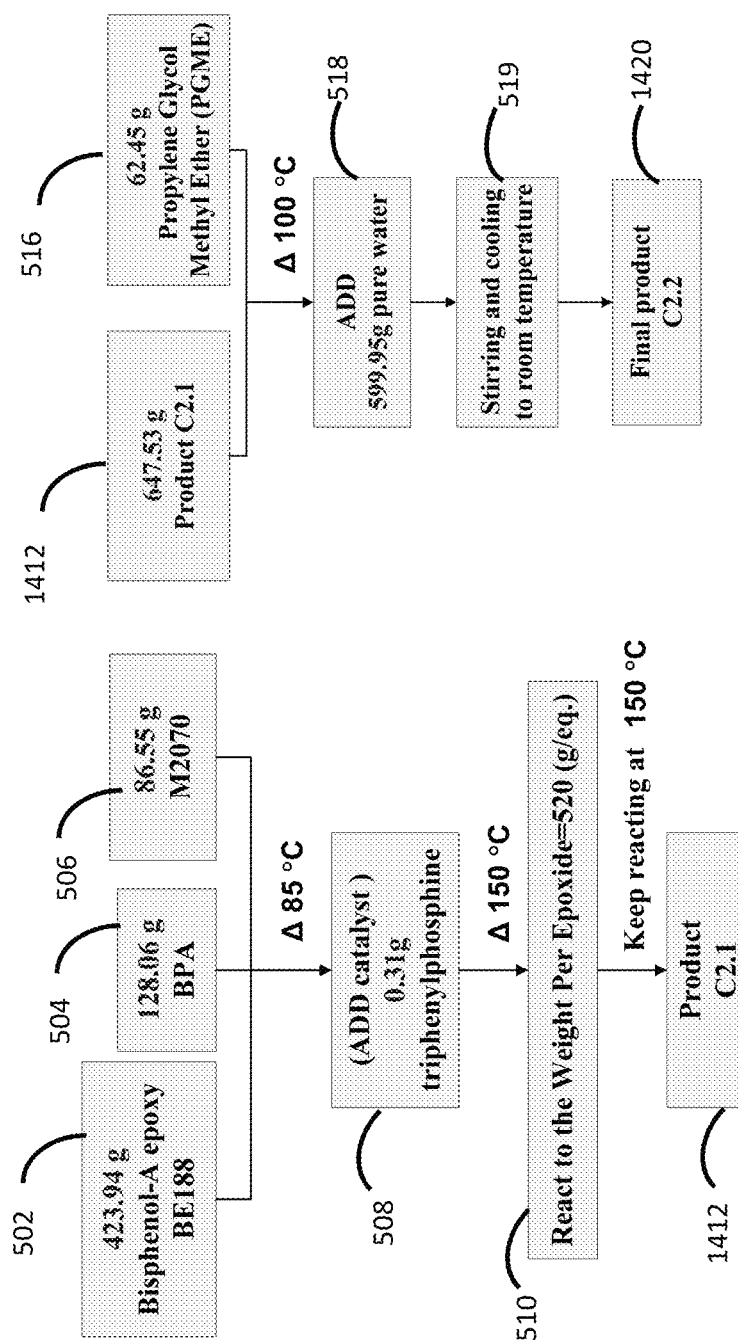
FIG. 13 is a flow diagram of Example 6 of the present invention showing steps and compounds used for making the epoxy resin C2.1 and the aqueous dispersion C2.2.

Example 6 is set as another comparative example for Examples 1 to 4. FIG. 13 is a flow diagram showing experimental steps and compositions used in making the epoxy resin C2.1 (1412) and the aqueous dispersion (i.e., water-borne epoxy resin) C2.2 (1420). The epoxy resin C2.1 (1412) and the aqueous dispersion C2.2 (1420) were prepared using methods and components as previously described in Example 1 except that no ESBO, which is used as (C) in Example 1, was used.

Accordingly, 423.94 g of BE188 (502), 128.06 g BPA (504), and 86.55 g of JEFFAMINE® M-2070 (506) were mixed and heated to about 85° C. as previously described, after which 0.31 g of triphenylphosphine catalyst was added (508) and the temperature was increased and maintained at 150° C. until the epoxide equivalent amount was about 520 g/eq. This provided poly aromatic amino glycidyl ether Intermediate 1A (510). The reaction mixture was maintained at 150° C. for a time (e.g., for about 90 more minutes) providing the reaction mixture product containing the epoxy resin C2.1 (1412). The reaction mixture product containing the epoxy resin C2.1 (1412) (647.53 g) was then mixed with 62.45 g of PGME (516) at 100° C. and mixed prior to addition of 599.95 g water (518). The mixture was stirred and cooled to room temperature (519) providing the aqueous dispersion C2.2 (1420).

Example 7—The Epoxy Resin C3.1 and the Aqueous Dispersion C3.2

Figure 14:
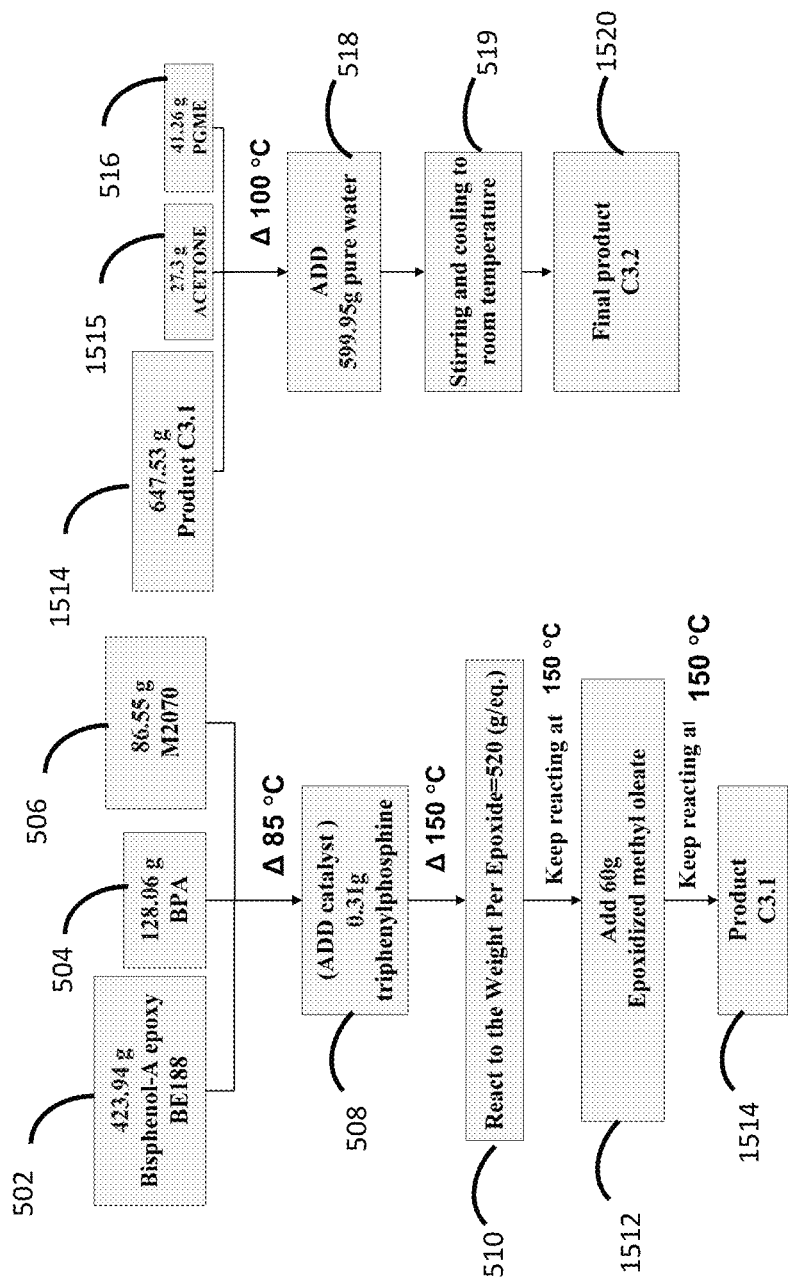
FIG. 14 is a flow diagram of Example 7 of the present invention showing steps and compounds used for making the epoxy resin C3.1 and the aqueous dispersion C3.2.

Example 7 is set as another comparative example for Examples 1 to 4. FIG. 14 is a flow diagram showing experimental steps and compositions used in making the epoxy resin C3.1 (1514) and the aqueous dispersion (i.e., water-borne epoxy resin) C3.2 (1520). The epoxy resin C3.1 (1514) and the aqueous dispersion C3.2 (1520) were prepared using the methods and components as previously described in Example 1 or in Example 3 except that epoxidized methyl oleate, having the structure XI shown here,

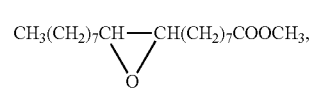

XI was used in place of ESBO or ECO used as (C) in Example 1 or 3, and acetone was used in combination with PGME for the dispersion step.

Therefore, 423.94 g of BE188 (502), 128.06 g BPA (504), and 86.55 g of polyetheramine JEFFAMINE® M-2070 (506), were mixed and reacted as previously described using 0.31 g of triphenylphosphine (508). This provided the corresponding poly aromatic amino glycidyl ether (Intermediate 1A) (510) which was further reacted with 60 g of Epoxidized methyl oleate (1512) (>99.9%) affording 647.53 g of the reaction mixture product containing the epoxy resin C3.1 (1514). The reaction mixture product containing the epoxy resin C3.1 (1514) was mixed with 27.3 g of acetone (1515) and 41.26 g of PGME (516) at 100° C. and mixed prior to addition of 599.95 g water (518). The mixture was stirred and cooled to room temperature (519) providing the aqueous dispersion C3.2 (1520).

Example 8—The Epoxy Resin C4.1 and the Aqueous Dispersion C4.2

Figure 15:
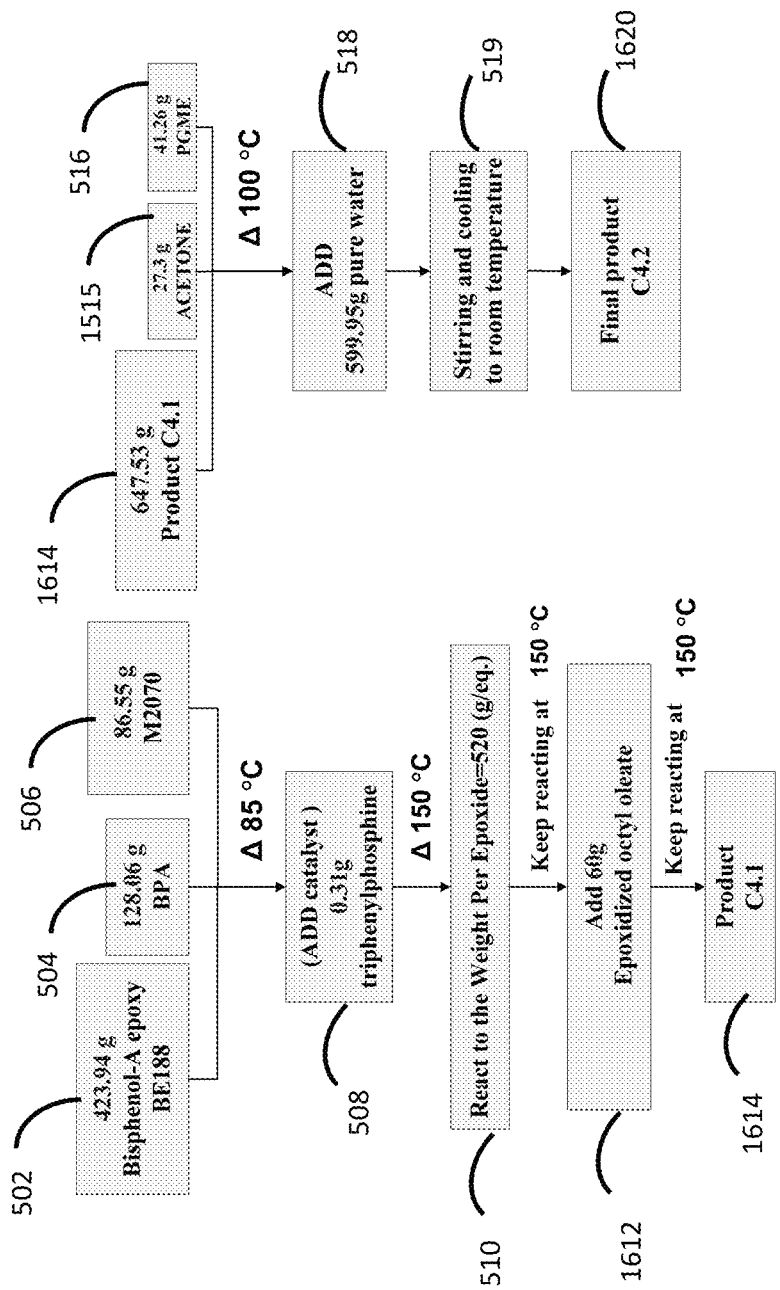
FIG. 15 is a flow diagram of Example 8 of the present invention showing steps and compounds used for making the epoxy resin C4.1 and the aqueous dispersion C4.2.

Example 8 is set as another comparative example for Examples 1 to 4. FIG. 15 is a flow diagram showing experimental steps and compositions used in making the epoxy resin C4.1 (1614) and the aqueous dispersion (i.e., water-borne epoxy resin) C4.2 (1620). The epoxy resin C4.1 (1614) and the aqueous dispersion C4.2 (1620) were prepared using methods and components as previously described to prepare in Example 7 except that epoxidized octlyl oleate having the structure XII shown here,

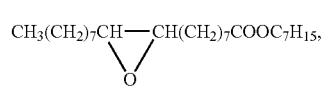

XII was used in place of the epoxidized methyl oleate.

Therefore, 423.94 g of BE188 (502), 128.06 g BPA (504), and 86.55 g of JEFFAMINE® M-2070 (506), were mixed and reacted as previously described using 0.31 g of triphenylphosphine (508). This provided the corresponding poly aromatic amino glycidyl ether (Intermediate 1A) (510) which was further reacted with 60 g of epoxidized octyl oleate (1612) (>99.9%) affording 647.53 g of the reaction mixture product containing the epoxy resin C4.1 (1614). The reaction mixture product containing epoxy resin C4.1 (1614) was mixed with 27.3 g of acetone (1515) and 41.26 g of PGME (516) at 100° C. and mixed prior to addition of 599.95 g water (518). The mixture was stirred and cooled to room temperature (519) providing the aqueous dispersion C4.2 (1620).

Example 9—The Water-Borne Epoxy Coating Composition

The water-borne epoxy coating compositions using the water-borne epoxy resins from the previous examples 1-8 were made. Table 1 lists the components used for making a part A and part B of the formulation of the water-borne epoxy coating composition.

Part A is made by combining water, white pigment, defoamer, rheological additive, talcum powder, a functional filler, a corrosion inhibitor, and dispersant in the proportions shown in Table 1. These are blended using a rotor stator at between 1500 and 3000 rpm. One of the water-borne epoxy resins S1.2, S2.2, S3.2, S4.2, $C_{1.3}$, C2.2, C3.2, or C4.2 is subsequently mixed into the blended mixture, providing Part A of a water-borne epoxy coating composition.

Part B of the coating formulation includes a mixture of a curing agent and a rust inhibitor in proportions shown in Table 1.

Optionally, part A and B can be combined to form another water-borne epoxy coating composition. In the forgoing, the water-borne epoxy coating compositions including A and B, where part A is made using the water-borne epoxy resins S1.2, S2.2, S3.2, S4.2, C1.3, C2.2, C3.2, or C4.2 will be referred to as S1, S2, S3, S4, C1, C2, C3 and C4 respectively.

TABLE 1

Formulation of The Water-Borne Epoxy Coating Composition

| Material | Supplier | Weight(g) | Remark |
|---|---|---|---|
| Part A | | | |
| DI Water | — | 75 | Deionized water |
| TiO$_2$ R960 | DuPont | 40 | white pigment |
| FOAMSTAR ® ST2438 | BASF | 0.8 | defoamer |
| Bentone DE | ELEMENTIS | 7 | rheological additive |
| H7000W | TALC | 60 | Talcum Powder |
| Blanc Fixe Micro+ | SACHTLEBEN | 40 | BaSO$_4$, functional filler |
| Zinc Phosphate | HALOX | 32 | corrosion inhibitor |
| Dispex CX 4320 | BASF | 4 | Dispersant |
| High speed disperse to 5-6 Hegman. Reduce speed and add: | | | |
| The epoxy resin | example 1 To 8 of This Disclosure | 160 | Water-borne epoxy resins S1.2, S2.2, S3.2, S4.2, C1.3, C2.2, C3.2, or C4.2 |
| Part B | | | |
| EPIKURE Curing Agent 8530-W-75 | HEXION | 19.75 | Curing agent |
| NALZIN FA 579 | ELEMENTIS | 2 | rust inhibitor |

Test 1—Fast Drying Test

Samples were coated with each of the water-borne epoxy coating compositions S1, S2, S3, S4, C1, C2, C3 and C4. These were cured at 60° C. for 30 minutes. The samples were then subjected to adhesion and hardness testing. The formulations applied as the water-borne epoxy coating compositions can have a range of hardness values that can be expressed by their film hardness using ASTM D 3363-00, which is the standard test method for film hardness by pencil test. The films also displayed a cross hatch adhesion of at least 5B according to ASTM D3359-09. Notably, as shown by the listed data in Table 2, the S1, S2, S3 and S4 coatings showed superior hardness as compared to C1, C2, C3 and C4.

TABLE 2

Fast Drying Test Results ASTM D3359-09 and D 3363-00

| Item | Adhesion test (ASTM D3359-09) | Hardness by Pencil Test (ASTM D 3363-00) |
|---|---|---|
| S1 | 5B | HB |
| S2 | 5B | HB |
| S3 | 5B | B |
| S4 | 5B | HB |
| C1 | 5B | 2B |
| C2 | 5B | 2B |
| C3 | 5B | 3B |
| C4 | 5B | 3B |

Test 2—Corrosion Testing

Figure 16:
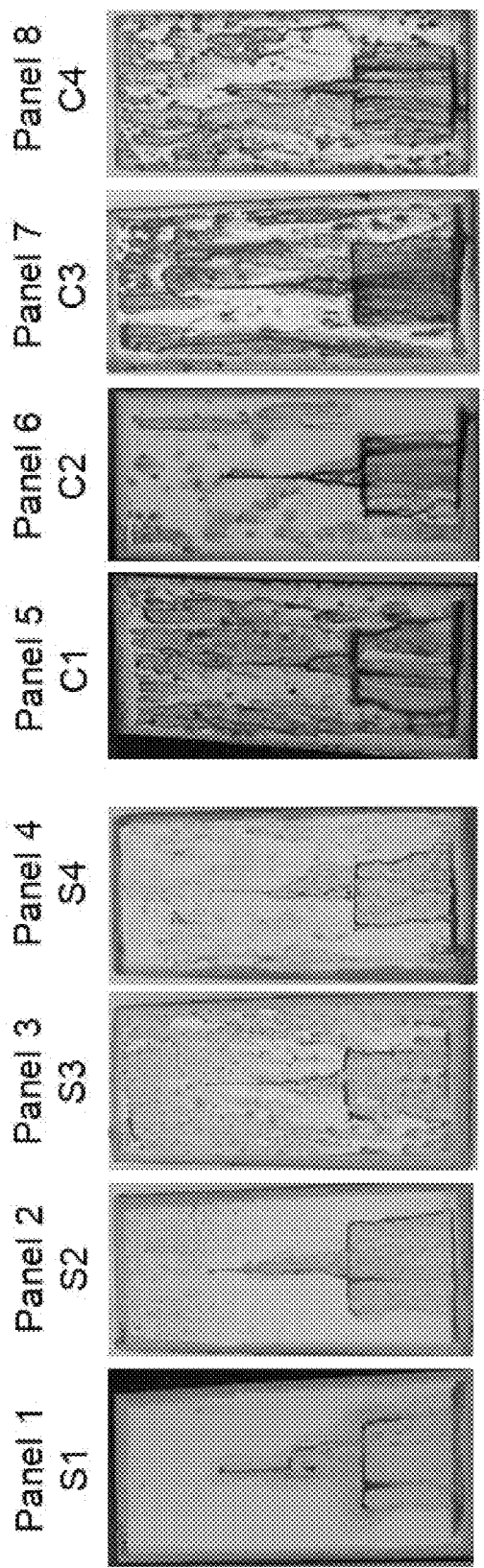
FIG. 16 shows photographs of samples coated with formulation containing the epoxy resins after being subjected to a corrosion test (Test 2).

Samples were coated with each of the water-borne epoxy coating compositions S1, S2, S3, S4, C1, C2, C3 and C4. These were prepared in triplicate and subjected to 250 hours of salt spray exposure according to ASTM Test Method B117. The average of the three tests for each coating is shown as the qualitative corrosion resistance of good, normal and poor, and a quantitative weight loss in Table 3. In addition, the results of one each of S1, S2, S3, S4, C1, C2, C3 and C4 are shown in FIG. 16 as, respectively, Panels 1-8 from left to right. The results show the better performance of sample coated with S1, S2, S3 and S4 as compared to C1, C2, C3 and C4. For example, the weight loss due to corrosion is higher in samples C1 through C4 as compared to S1 through S4, and the samples C1, C3 and C4 are visually more corroded than S1, S2 and S4.

TABLE 3

Corrosion Tabulated results

| Item | Corrosion resistance | Weight loss(g) |
|---|---|---|
| S1 | GOOD | 0.1033 |
| S2 | GOOD | 0.1321 |
| S3 | NORMAL | 0.1657 |

TABLE 3-continued

Corrosion Tabulated results

| Item | Corrosion resistance | Weight loss(g) |
| --- | --- | --- |
| S4 | GOOD | 0.1455 |
| C1 | POOR | 0.3869 |
| C2 | NORMAL | 0.2366 |
| C3 | POOR | 0.3712 |
| C4 | POOR | 0.3755 |

Test 3—Impact Testing

Figure 17:
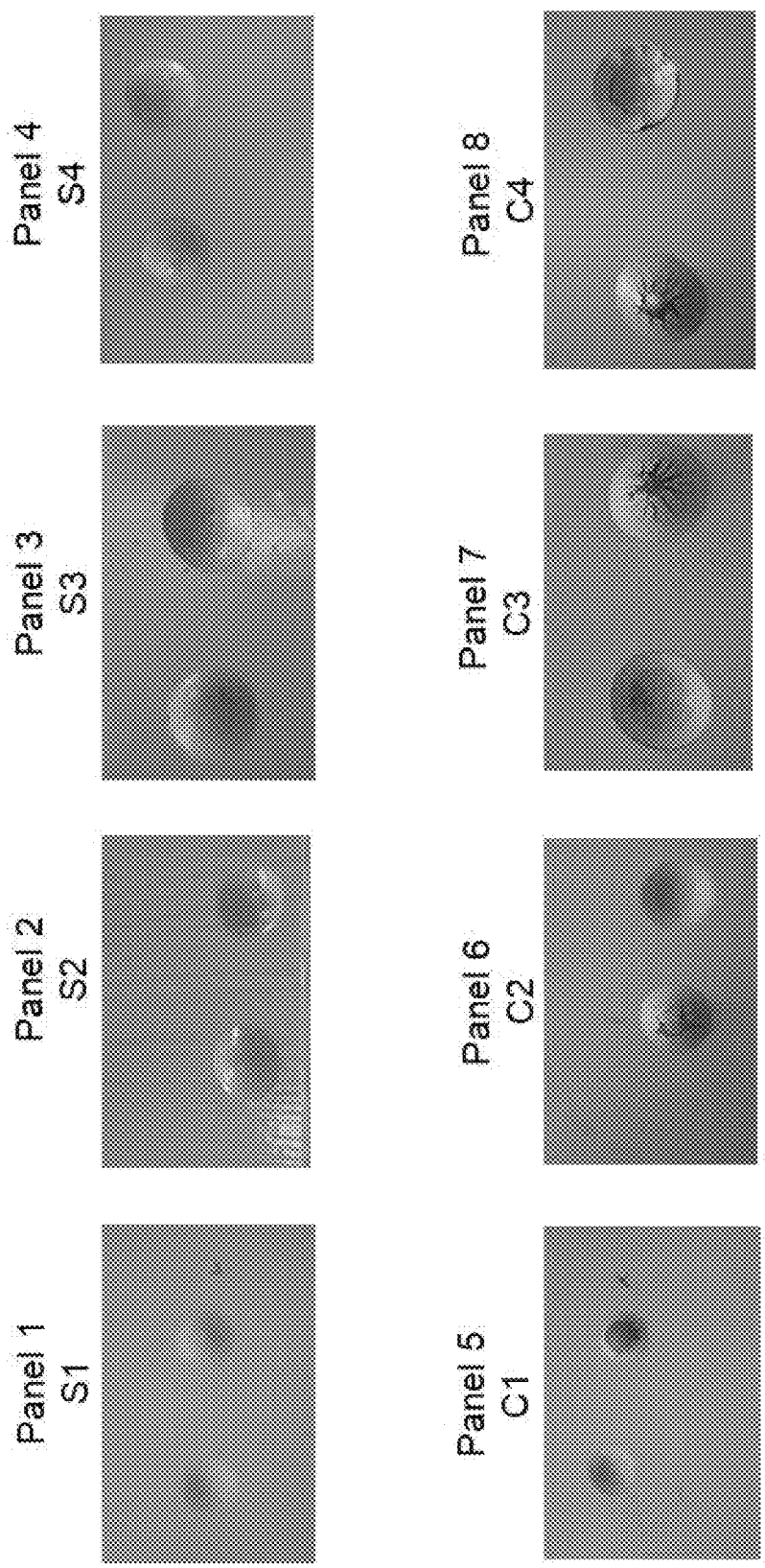
FIG. 17 shows photographs of samples including coatings formulated using the epoxy resins after being subjected to an impact test (Test 3).

Samples made using water-borne epoxy coating compositions S1, S2, S3, S4, C1, C2, C3 and C4 were also tested for their response to impact. Accordingly, the samples were tested using ASTM test D2794. The results of these tests are tabulated in Table 4, where an "O" indicates a test where the impact test did not cause the coating skin to be broken through and "X" indicates where the film skin was broken. The corresponding results are shown in FIG. 17.

TABLE 4

Impact Test Tabulated results

| Impact test | S1 | S2 | S3 | S4 |
| --- | --- | --- | --- | --- |
| 1 kg-50 cm | O | O | O | O |
| | C1 | C2 | C3 | C4 |
| | X | X | X | X |

As above, in addition to the polymers described herein being formulated into epoxy resins and aqueous dispersions thereof, these epoxy resins can form coating compositions having high corrosion resistance, high adhesion to their coating surface and high impact resistance. Coatings made using these epoxy resins impart improved surface characteristics such as high hardness, good adhesion, good impact resestance, good corrosion resistance and low VOCs.

As used herein the term "comprising" or "comprises" is used in reference to compositions, methods, and respective component(s) thereof, that are essential to the claimed invention, yet open to the inclusion of unspecified elements, whether essential or not.

As used herein the term "consisting essentially of" refers to those elements required for a given embodiment. The term permits the presence of elements that do not materially affect the basic and novel or functional characteristic(s) of that embodiment of the claimed invention.

The term "consisting of" refers to compositions, methods, and respective components thereof as described herein, which are exclusive of any element not recited in that description of the embodiment.

As used in this specification and the appended claims, the singular forms "a," "an," and "the" include plural references unless the context clearly dictates otherwise. Thus for example, references to "the method" includes one or more methods, and/or steps of the type described herein and/or which will become apparent to those persons skilled in the art upon reading this disclosure and so forth. Similarly, the word "or" is intended to include "and" unless the context clearly indicates otherwise.

Other than in the operating examples, or where otherwise indicated, all numbers expressing quantities of ingredients or reaction conditions used herein should be understood as modified in all instances by the term "about." The term "about" when used in connection with percentages may mean±5% (e.g., ±4%, ±3%, ±2%, ±1%) of the value being referred to.

Where a range of values is provided, each numerical value between the upper and lower limits of the range is contemplated and disclosed herein.

Unless otherwise defined herein, scientific and technical terms used in connection with the present application shall have the meanings that are commonly understood by those of ordinary skill in the art. Further, unless otherwise required by context, singular terms shall include pluralities and plural terms shall include the singular.

It should be understood that this invention is not limited to the particular methodology, protocols, and reagents, etc., described herein and as such may vary. The terminology used herein is for the purpose of describing particular embodiments only, and is not intended to limit the scope of the present invention, which is defined solely by the claims.

All patents, patent applications, and publications including ASTM methods identified are expressly incorporated herein by reference for the purpose of describing and disclosing, for example, the methodologies described in such publications that can be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. An epoxy resin comprising:
a polymer having a structure of general formula (I):

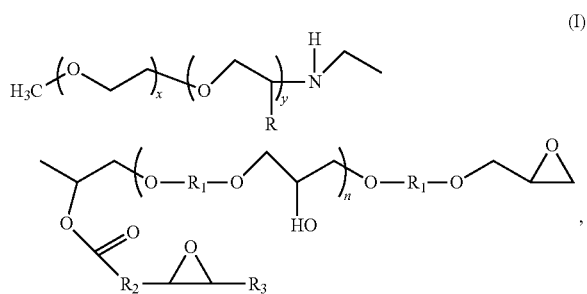

wherein R is hydrogen or $CH_3$;
$R_1$ is an organic linking group;
$R_2$ and $R_3$ independently represent $C_1$-$C_{20}$ alkyl, $C_1$-$C_{20}$ alkenes, epoxides group or glycidyl ethers group thereof;
n represents the number of repeating units and is an integer in the range of 1 to 20;
x represents the number of repeating units and is an integer of from 1 to 40; and
y represents the number of repeating units and is a number from about 1 to 40.

2. The epoxy resin of claim 1, wherein the organic linking group is at least one selected from the group consisting of:

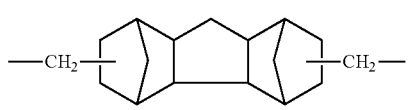

33
-continued
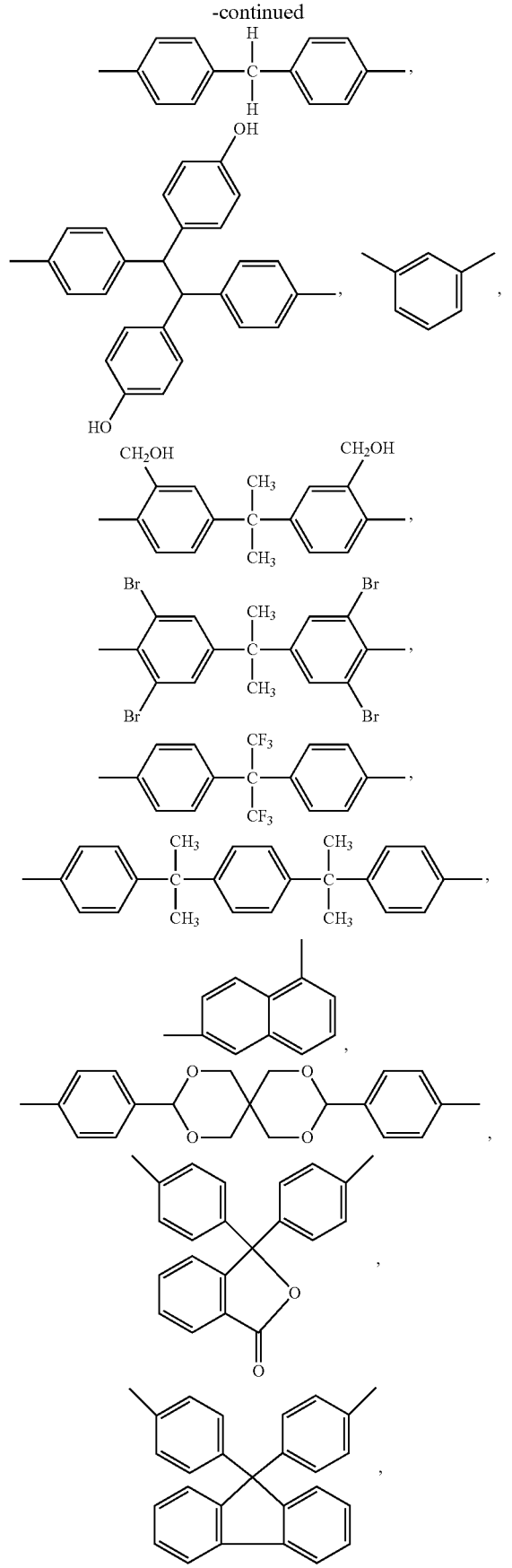
34
-continued
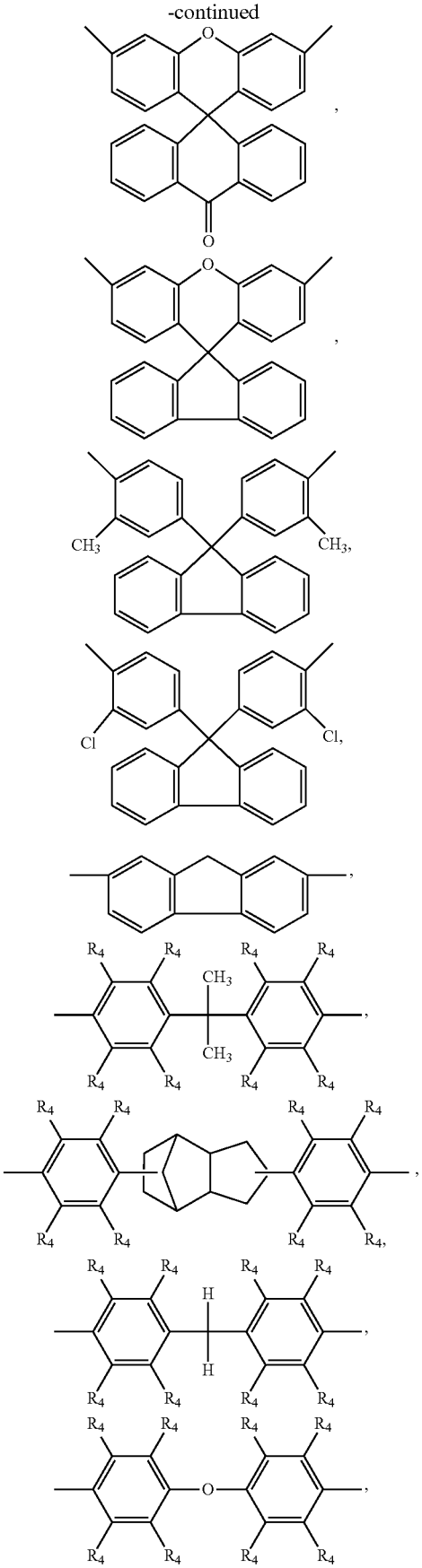

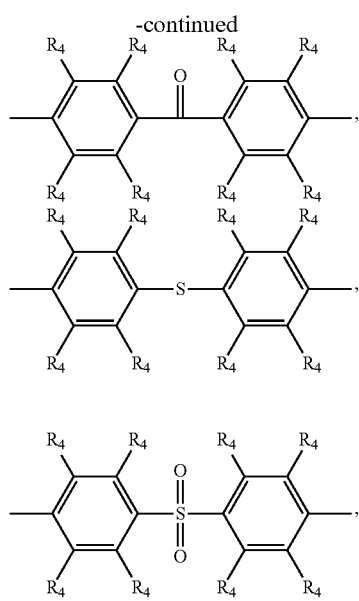
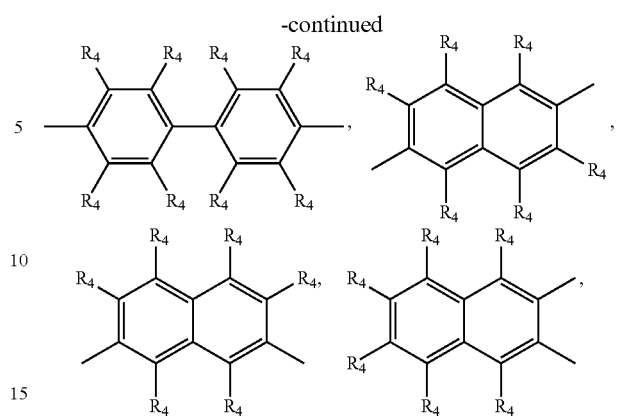
wherein each $R_4$ independently represents one selected from the group consisting of H, F, Cl, Br, $C_1$-$C_{10}$ alkyl, $C_1$-$C_{10}$ alkoxy, a cyclic alkyl group having 3-7 carbon atoms, phenyl, and phenoxy group.
3. The epoxy resin of claim 1, having a structure of at least one selected from the group consisting of general formulas (II), (III) and (IV):
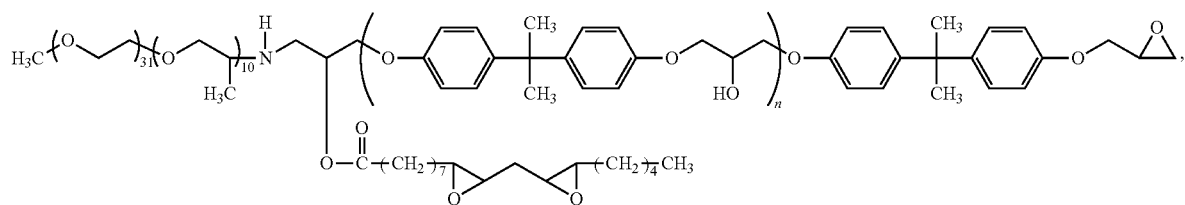
(II)
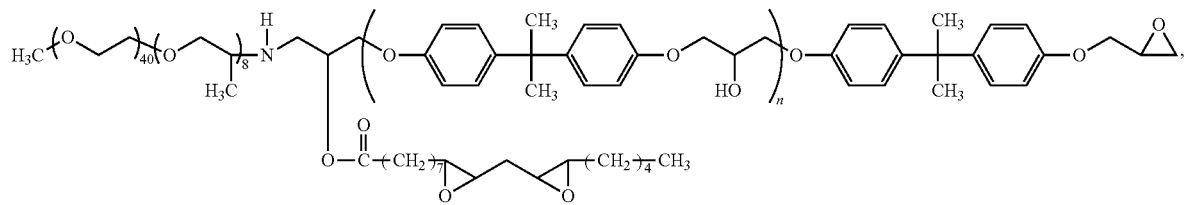
(III)
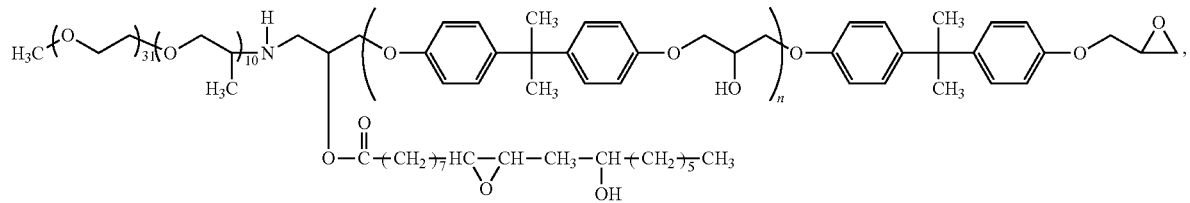
(IV)

wherein each n represents the number of repeating units and is an integer in the range of 1 to 4.

4. An aqueous dispersion of the epoxy resin of claim 1 in an aqueous medium.

5. The aqueous dispersion of claim 4, wherein the epoxy resin having a structure of general formula (I):

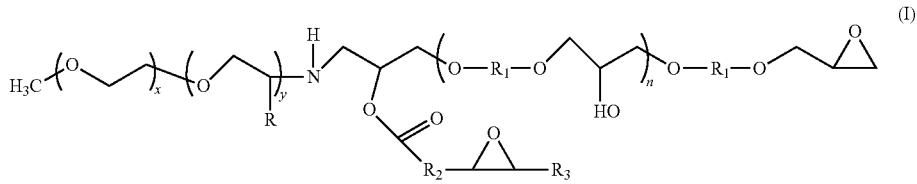

wherein R is hydrogen or CH$_3$,

R$_1$ is an organic linking group,

R$_2$ and R$_3$ represent C$_1$-C$_{20}$ alkyl, C$_1$-C$_{20}$ alkenes, or glycidyl ethers thereof or other organic linking groups, n represents the number of repeating units and is an integer in the range of 1 to 4;

x represents the number of repeating units and is an integer of from 1 to 40;

y represents the number of repeating units and is a number from about 1 to 40.

6. The aqueous dispersion of the epoxy resin of claim 5 wherein the epoxy resin having a structure of at least one selected from the group consisting of general formulas (II), (III) and (IV):

agent, a rheology modifier, a filler, an extender, a corrosion inhibitor, water and combinations thereof.

8. The water-borne coating composition of claim 7, further comprising a curing agent.

9. The water-borne epoxy coating composition of claim 8, wherein the water-borne epoxy coating composition having a hardness by pencil test (ASTM D 6636-00) of equal to or greater than B degree.

10. The water-borne epoxy coating composition of claim 9, wherein the water-borne epoxy coating composition having adhesion degree of 5B by adhesion test (ASTM D 3359-09).

11. A water-borne epoxy coating composition comprising:
the epoxy resin of claim 2, and further comprising at least one additive selected from a pigment, an anti-foaming agent, a rheology modifier, a filler, an extender, a corrosion inhibitor, water and combinations thereof.

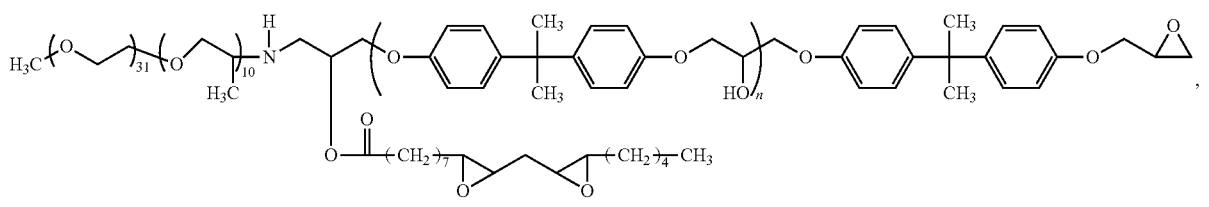

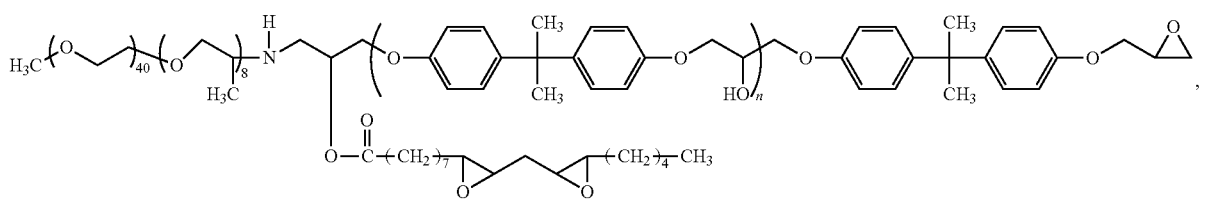

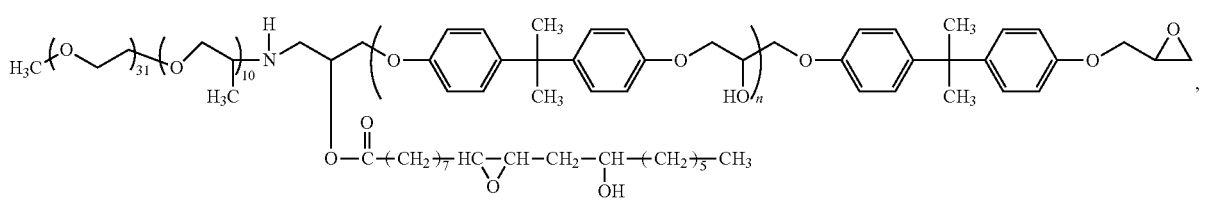

wherein n represents the number of repeating units and is an integer in the range of 1 to 4.

7. A water-borne epoxy coating composition comprising: the epoxy resin of claim 1, and further comprising at least one additive selected from a pigment, an anti-foaming 12. The water-borne epoxy coating composition of claim 11, further comprising a curing agent.

13. A water-borne epoxy coating composition comprising: the epoxy resin of claim 3, and further comprising at least one additive selected from a pigment, an anti-foaming agent, a rheology modifier, a filler, an extender, a corrosion inhibitor, water and combinations thereof.

14. The water-borne epoxy coating composition of claim 13, further comprising a curing agent.

* * * * *

UNITED STATES PATENT AND TRADEMARK OFFICE
CERTIFICATE OF CORRECTION

PATENT NO.        : 10,450,478 B1
APPLICATION NO.   : 16/371719
DATED             : October 22, 2019
INVENTOR(S)       : Ying-Jui Lin et al.

Page 1 of 1

It is certified that error appears in the above-identified patent and that said Letters Patent is hereby corrected as shown below:

In the Claims

In Claim 5, Line 6, --epoxides group-- is inserted before "or.".

In Claim 7, Line 3, --a dye,-- is inserted after the term "a pigment,".

Signed and Sealed this
Twenty-fourth Day of December, 2019

Andrei Iancu
*Director of the United States Patent and Trademark Office*